US012456304B2

(12) United States Patent
Weston et al.

(10) Patent No.: US 12,456,304 B2
(45) Date of Patent: Oct. 28, 2025

(54) METHODS AND APPARATUS TO DETERMINE THE LOAD OF A VEHICLE VIA CAMERA BASED HEIGHT MEASUREMENT

(71) Applicant: Ford Global Technologies, LLC, Dearborn, MI (US)

(72) Inventors: Keith Weston, Canton, MI (US); Michael Alan McNees, Flat Rock, MI (US); Lorne Forsythe, Novi, MI (US); Andrew Niedert, New Hudson, MI (US); Francis Aroyehun, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 618 days.

(21) Appl. No.: 17/845,557

(22) Filed: Jun. 21, 2022

(65) Prior Publication Data

US 2023/0410528 A1 Dec. 21, 2023

(51) Int. Cl.
G06V 20/56 (2022.01)
G06T 7/60 (2017.01)
B60G 17/019 (2006.01)

(52) U.S. Cl.
CPC ............... *G06V 20/56* (2022.01); *G06T 7/60* (2013.01); *B60G 17/019* (2013.01);
(Continued)

(58) Field of Classification Search
CPC .......... G06V 20/56; G06V 10/19; G06T 7/60; G06T 2207/30252; B60G 17/019;
(Continued)

(56) References Cited

U.S. PATENT DOCUMENTS 5,410,109 A 4/1995 Tarter et al.
5,603,556 A 2/1997 Klink
(Continued)

FOREIGN PATENT DOCUMENTS

CN 201787411 U 4/2011
CN 109537419 A 3/2019
(Continued)

OTHER PUBLICATIONS

United States Patent and Trademark Office, "Non-Final Office Action," issued in connection with U.S. Appl. No. 17/947,908, dated Apr. 29, 2025, 10 pages.
(Continued)

*Primary Examiner* — Oneal R Mistry
*Assistant Examiner* — Jongbong Nah
(74) *Attorney, Agent, or Firm* — Hanley, Flight & Zimmerman, LLC; Lorne Forsythe

(57) ABSTRACT

Methods, apparatus, systems, and articles of manufacture to determine the load of a vehicle via camera-based height measurement are disclosed herein. An example vehicle described herein includes a suspension assembly associated with a wheel, a first feature, a first camera, and a processor to execute instructions to capture, via the first camera, a first image including the first feature and a second feature, the first feature and a second feature having a first spatial relationship in the first image, capture, via the first camera, a second image including the first feature and the second feature, the first feature and the second feature having a second spatial relationship in the second image, and determine, based on a difference between the first spatial relationship and the second spatial relationship, a deflection of the suspension assembly.

20 Claims, 14 Drawing Sheets

(52) U.S. Cl.
CPC .... *B60G 2400/252* (2013.01); *B60G 2400/60* (2013.01); *B60G 2401/14* (2013.01); *G06T 2207/30252* (2013.01)

(58) Field of Classification Search
CPC .......... B60G 2400/252; B60G 2400/60; B60G 2401/14; B60G 17/017; B60G 17/0182; B60G 2400/82; B60G 17/0165; B60G 2401/142
See application file for complete search history.

(56) References Cited

U.S. PATENT DOCUMENTS

| | | |
|---|---|---|
| 5,817,989 A | 10/1998 | Shimizu |
| 6,037,550 A | 3/2000 | Bradley |
| 6,384,349 B1 | 5/2002 | Voll |
| 7,009,118 B2 | 3/2006 | Pottebaum et al. |
| 7,594,441 B2 | 9/2009 | Gudat et al. |
| 7,864,066 B2 | 1/2011 | Kriel et al. |
| 9,605,994 B2 | 3/2017 | Jensen |
| 2005/0219042 A1 | 10/2005 | Thomson |
| 2009/0084173 A1 | 4/2009 | Gudat et al. |
| 2012/0127310 A1* | 5/2012 | Kim .......................... B60R 1/24 348/148 |
| 2016/0221591 A1 | 8/2016 | Kuehbandner et al. |
| 2019/0335100 A1* | 10/2019 | Chen ......................... B60R 1/26 |
| 2021/0127310 A1* | 4/2021 | Lee ......................... H04W 36/30 |
| 2021/0291832 A1* | 9/2021 | Simmons ............... B60K 35/28 |
| 2021/0387637 A1* | 12/2021 | Rogers ............... G01B 11/2755 |
| 2023/0122725 A1 | 4/2023 | Frea |
| 2023/0215183 A1* | 7/2023 | Bahramgiri .............. B60D 1/62 382/104 |
| 2024/0034116 A1* | 2/2024 | Coombs ............. B60G 17/0165 |

FOREIGN PATENT DOCUMENTS

| | | | |
|---|---|---|---|
| JP | 2011209251 A | * | 10/2010 |
| JP | 5429565 B1 | | 1/2011 |

OTHER PUBLICATIONS

United States Patent and Trademark Office, "Non-Final Office Action," issued in connection with U.S. Appl. No. 17/947,908, dated Jan. 16, 2025, 5 pages.

* cited by examiner

METHODS AND APPARATUS TO DETERMINE THE LOAD OF A VEHICLE VIA CAMERA BASED HEIGHT MEASUREMENT

FIELD OF THE DISCLOSURE

This disclosure relates generally to vehicle load management and, more particularly, to methods and apparatus to determine the load of a vehicle via camera-based height measurement.

BACKGROUND

All vehicles have a maximum limit on a load the front and rear axles can withstand. In some examples, each axle has a gross axle weight rating (GAWR) that corresponds to the maximum load that may be supported by the axle. Additionally, weight can be poorly distributed on/in the vehicle. If an axle of the vehicle is overloaded or the vehicle is unbalanced, handling degradation, brake problems, and poor headlight aim can occur. In some examples, a vehicle may be misloaded if a particular axle or suspension assembly is bearing a disproportionate amount of the total load on the vehicle. Loading issues can often be relieved by redistributing objects (e.g., cargo, passengers, etc.) to different sections of the vehicle.

SUMMARY

An example vehicle described herein includes a suspension assembly associated with a wheel, a first feature, a first camera, and a processor to execute instructions to capture, via the first camera, a first image including the first feature and a second feature, the first feature and a second feature having a first spatial relationship in the first image, capture, via the first camera, a second image including the first feature and the second feature, the first feature and the second feature having a second spatial relationship in the second image, and determine, based on a difference between the first spatial relationship and the second spatial relationship, a deflection of the suspension assembly.

An example method described herein includes capturing, via a first camera associated with a vehicle, a first image including a first feature of the vehicle and a second feature adjacent to the vehicle, the first feature and the second feature having a first spatial relationship in the first image, capturing, via the first camera, a second image including the first feature and the second feature, the first feature and the second feature having a second spatial relationship in the second image, and determining, based on a difference between the first spatial relationship and the second spatial relationship, a deflection of a suspension assembly of the vehicle.

An example non-transitory computer readable storage medium disclosed herein includes instructions that, when executed, cause a processor to capture, via a first camera associated with a vehicle, a first image including a first feature of the vehicle and a second feature, the first feature and the second feature having a first spatial relationship in the first image, capture, via the first camera, a second image including the first feature and the second feature, the first feature and the second feature having a second spatial relationship in the second image, and determine, based on a difference between the first spatial relationship and the second spatial relationship, a deflection of a suspension assembly of the vehicle.

Figure 1:
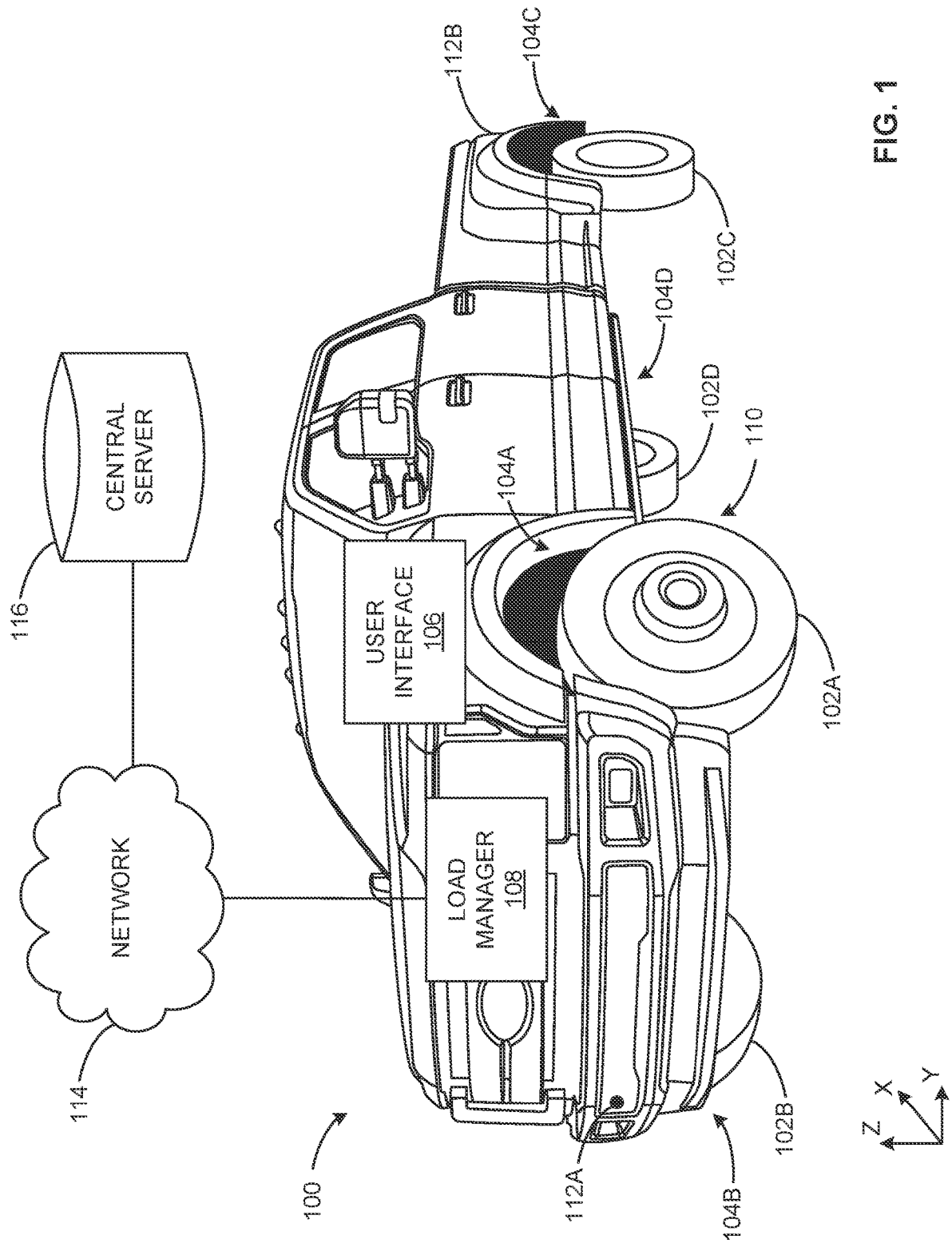
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis. As used herein, rotation about the longitudinal axis is referred to as "roll rotation" and rotation about the horizontal axis is referred to as "pitch rotation."

The load on a vehicle can be determined based on ride height information received from ride height sensors. Particularly, vehicle computers can use vehicle ride height sensors and a suspension displacement model to determine the load carried by each of the wheels of the vehicle. In some examples, the suspension displacement model relates the displacement of the suspension components to the load of the vehicle and is generated during the calibration of the vehicle during manufacturing. In some such examples, such calibration is required because of manufacturing and/or assembly variations in the system. Example systems for determining the weight of a vehicle are disclosed in Pearson, U.S. Pat. No. 11,008,014, which is hereby incorporated by reference in its entirety. However, ride height sensors incur additional costs for vehicle manufacturers, given the cost of silicon-based components. Other methods of determining vehicle loading, such as methods that use strain gauges, also have similar cost-based challenges.

Examples disclosed herein overcome the above-noted deficiencies by using existing vehicle cameras to determine vehicle ride height changes and eliminate the need for using other load sensors (e.g., ride height sensors, strain gauges, etc.). In some examples disclosed herein, an image captured by a camera when the vehicle is unloaded (e.g., curb weight image, etc.) is compared to an image captured after the vehicle is loaded. In some examples, known reference points in both images are compared to determine the magnitude of load change. In some examples disclosed herein, photogrammetry techniques are applied to the captured images to increase measurement fidelity. In some examples disclosed herein, auxiliary lighting disposed near the cameras is used to reduce the effects of shadows in the captured images.

In some examples disclosed herein, images captured by a rear-facing camera (e.g., a back-up camera, a center high-mounted stop lamp (CHMSL) camera, etc.) is used to determine changes in vehicle load. In some examples disclosed herein, the known reference point is a feature on the sprung mass of the vehicle. In some examples disclosed herein, the known reference point is a hitch ball. In some such examples disclosed herein, a user of the vehicle can input the diameter of the hitch ball via a user interface of the vehicle. In some examples disclosed herein, a combination of images from the front-facing and rear-facing cameras can be used to determine if the vehicle is disposed on a substantially flat surface and/or if the vehicle is experiencing a substantial pitch. In some examples disclosed herein, image recognition techniques are used to identify objects loaded on a vehicle (e.g., a bicycle wheel, etc.) with known sizes as known reference points.

In recent years, off-road vehicles have been equipped with underbody cameras by original vehicle manufacturers and aftermarket part manufacturers. In some examples disclosed herein, images captured by an undercarriage/underbody camera is used to determine changes in vehicle load. In some examples disclosed herein, images captured by the camera can be analyzed to determine the relative ground clearance of the camera. In some examples, look-up tables and/or image comparisons re used to determine the sprung mass of the vehicle. In some examples, machine-learning algorithms can be used to refine vehicle calibration over time to account for wear of the suspension components and similar effects. In some examples disclosed herein, visually identifiable suspension features (e.g., spring seats, Panhard bolts, etc.) can be used as reference points. In some examples disclosed herein, features can be added (e.g., targets, etc.) to underbody features can be used to determine changes in ride height.

FIG. 1 is a perspective view of an example vehicle 100 in which examples disclosed herein can be implemented. In the illustrated example of FIG. 1, the vehicle includes an example first wheel 102A, an example second wheel 102B, an example third wheel 102C, and an example fourth wheel 102D. In the illustrated example of FIG. 1, the wheels 102A, 102B, 102C, 102D have an example first suspension component 104A, an example second suspension component 104B, an example third suspension component 104C, and an example fourth suspension component 104D, respectively. In the illustrated example of FIG. 1, the vehicle 100 includes an example user interface 106, an example load manager 108, an example underbody camera 110, an example front-facing camera 112A, and an example rear-facing camera 112B. In the illustrated example of FIG. 1, the vehicle 100 is connected, via an example network 114, to an example central server 116.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle. In some examples, the vehicle 100 can be a fully autonomous vehicle and/or a partially autonomous vehicle.

The wheels 102A, 102B, 102C, 102D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 102A and the second wheel 102B are front wheels and the third wheel 102C and the fourth wheel 102D are rear wheels. In the illustrated example of FIG. 1, the first wheel 102A and the third wheel 102C are driver-side wheels and the second wheel 102B and the fourth wheel 102D are passenger-side wheels.

The suspension components 104A, 104B, 104C, 104D are the components of the suspension system of the vehicle 100 that couple the sprung mass of the vehicle 100 (e.g., the components of the vehicle 100 above the suspension components 104A, 104B, 104C, 104D, items loaded on the vehicle 100, etc.) to the wheels 102A, 102B, 102C, 102D, respectively. The suspension components 104A, 104B, 104C, 104D absorb and/or dampen forces and vibrations transmitted between the sprung mass and the wheels 102A, 102B, 102C, 102D. In some examples, the suspension components 104A, 104B, 104C, 104D can include springs (or other similar elastic objects) and shocks/dampers. In other examples, the suspension components 104A, 104B, 104C, 104D can include other suitable means of absorbing and dampening impacts (e.g., air springs, etc.). The deflection of the suspension components 104A, 104B, 104C, 104D can be correlated to the load carried by each of the suspension components 104A, 104B, 104C, 104D (e.g., via Hooke's law, etc.).

The user interface 106 enables a user of the vehicle 100 to receive and input information to the load manager 108 and other systems of the vehicle 100. For example, the user interface 106 can include a display of the vehicle 100. Additionally or alternatively, the user interface 106 can include one or more dash indicator(s), one or more button(s) on the dashboard or steering wheel, one or more speakers, one or more microphones, etc. In some examples, the user interface 106 can be fully or partially implemented by a mobile device of the user (e.g., a mobile phone, a smartwatch, a tablet, etc.).

The load manager 108 receives data from the cameras 110, 112A, 112B and determines a deflection of the suspension components 104A, 104B, 104C, 104D. In some examples, the load manager 108 determines a load condition on the vehicle 100 based on the deflections of the suspension components 104A, 104B, 104C, 104D. As used herein, the term "load condition" refers to all relevant vehicle weight metrics including, but not limited to, the gross vehicle weight, a sprung mass of the vehicle 100, and a distribution of the load on the vehicle 100. In some examples, if the load condition satisfies a threshold, the load manager 108 can generate an alert to indicate to a user of the vehicle 100 that the vehicle 100 is improperly loaded and/or overloaded, etc. In some such examples, the load manager 108 can use the determined load condition to change a performance characteristic associated with the vehicle 100. For example, the load manager 108 can change a property (e.g., stiffness, suspension displacement, etc.) of the suspension system of the vehicle 100 (e.g., the vehicle 100 includes an active suspension system, the vehicle 100 includes a semi-active suspension system, etc.). In other examples, the load manager 108 can control any other suitable characteristic associated with the vehicle 100 (e.g., a braking boost, a power-steering assistance, etc.). In the illustrated example of FIG. 1, the load manager 108 is communicatively coupled to the user interface 106. An example implementation of the load manager 108 is described below in conjunction with FIG. 2.

The cameras 110, 112A, 112B are devices that capture live images used by the load manager 108. In some examples, some or all of the cameras 110, 112A, 112B can be implemented by video cameras (e.g., generate continuous video data, etc.). Additionally or alternatively, some or all of the cameras 110, 112A, 112B can be implemented by photography (e.g., still image, etc.) cameras. In some examples, the cameras 110, 112A, 112B can periodically capture images (e.g., every 5 seconds, every 30 seconds, every minute, etc.). In the illustrated example of FIG. 1, each of the cameras 110, 112A, 112B serves functions in addition to providing sensor data to enable the load manager 108 to determine the load on the vehicle 100. In some examples, some or all of the cameras 110, 112A, 112B can be absent and/or not used to determine the load on the vehicle 100. In some such examples, alternative optical sensors can replace some or all of the cameras 110, 112A, 112B. As used herein, the term "optical sensor" refers to all types of devices that capture visual data (e.g., visual light, infrared, etc.) and is inclusive of the term "camera."

The underbody camera 110 is disposed on the undercarriage/underbody of the vehicle 100. In some examples, a controller of the vehicle 100 uses images from the camera 110 to identify obstacles under the vehicle 100 that may damage the vehicle 100. In some examples, when the vehicle 100 is loaded, the load manager 108 can reposition the underbody camera 110 to point at the components of the vehicle 100 instead of the ground. In other examples, the underbody camera 110 is initially oriented in a manner that does require reorientation to view the components of the vehicle 100.

In the illustrated example of FIG. 1, the rear-facing camera 112B is positioned adjacent to the rear bumper of the vehicle 100. For example, the rear-facing camera 112B can be a back-up camera of the vehicle 100. In other examples, the rear-facing camera 112B is disposed above the bed of the vehicle 100 (e.g., adjacent to a CHMSL, etc.) and/or any other suitable rear-facing camera. In the illustrated example of FIG. 1, the front-facing camera 112A is positioned adjacent to the front bumper of the vehicle 100. For example, the front-facing camera 112A can be used to identify obstacles immediately in front of the vehicle 100 that are not visible from the driving seat of the vehicle 100.

In some examples, vehicle lighting can be oriented into the view of any one of the cameras 110, 112A, 112B to improve the ability of the cameras 110, 112A, 112B to detect visually identifiable features for the purposes of load determination. For example, vehicle lamps (e.g., head lamps, tail lamps, CHSM lamps, etc.) can be used to improve the visibility of objects captured via the cameras 112A, 112B. In some such examples, light generated by the vehicle lamps can be redirected (e.g., via light tunnels, via mirrors, etc.) to improve the visibility of objects captured via the underbody camera 110. Additionally or alternatively, auxiliary lighting (e.g., dedicated lamps, etc.) can be used to improve the visibility of objects captured via the cameras 110, 112A, 112B. In some such examples, the use of vehicle lighting to illuminate the view of the underbody camera 110 may be particularly advantageous, given that natural light may be blocked by the body of the vehicle 100, thereby preventing the clear viewing of features on the underbody of the vehicle 100 by the underbody camera 110. Additionally or alternatively, one or more of the cameras 110, 112A, 112B can include night-vision cameras and/or infrared (IR) cameras.

The network 114 enables communications between the vehicle 100 (e.g., the load manager 108, etc.) and other network entities (e.g., the central server 116, other vehicles, etc.). In some examples, the network 114 can be implemented as a cellular network, the internet, a cellular network, or any other suitable wide area network (WAN). In other examples, the network 114 can be a wired connection. In some such examples, the vehicle 100 can interface with the central server 116 via a wired connection (e.g., the vehicle 100 can be connected while the vehicle 100 is being serviced, etc.). In some examples, the network 114 can be implemented via multiple networks (e.g., a local area network coupled to a wide area network, etc.).

The central server 116 that stores information relating to the vehicle 100. For example, the central server 116 can include performance data relating to the vehicle 100 and other vehicles similar to the vehicle 100. In some examples, the central server 116 is maintained by a manufacturer of the vehicle 100, a manufacturer of the cameras 110, 112A, 112B, and/or a manufacturer of the suspension components 104A, 104B, 104C, 104D. Additionally or alternatively, the central server 116 can be maintained by any other suitable entity (e.g., a government entity, a third-party agency, etc.). In some examples, the network 114 and/or the central server 116 can be absent.

Figure 2:
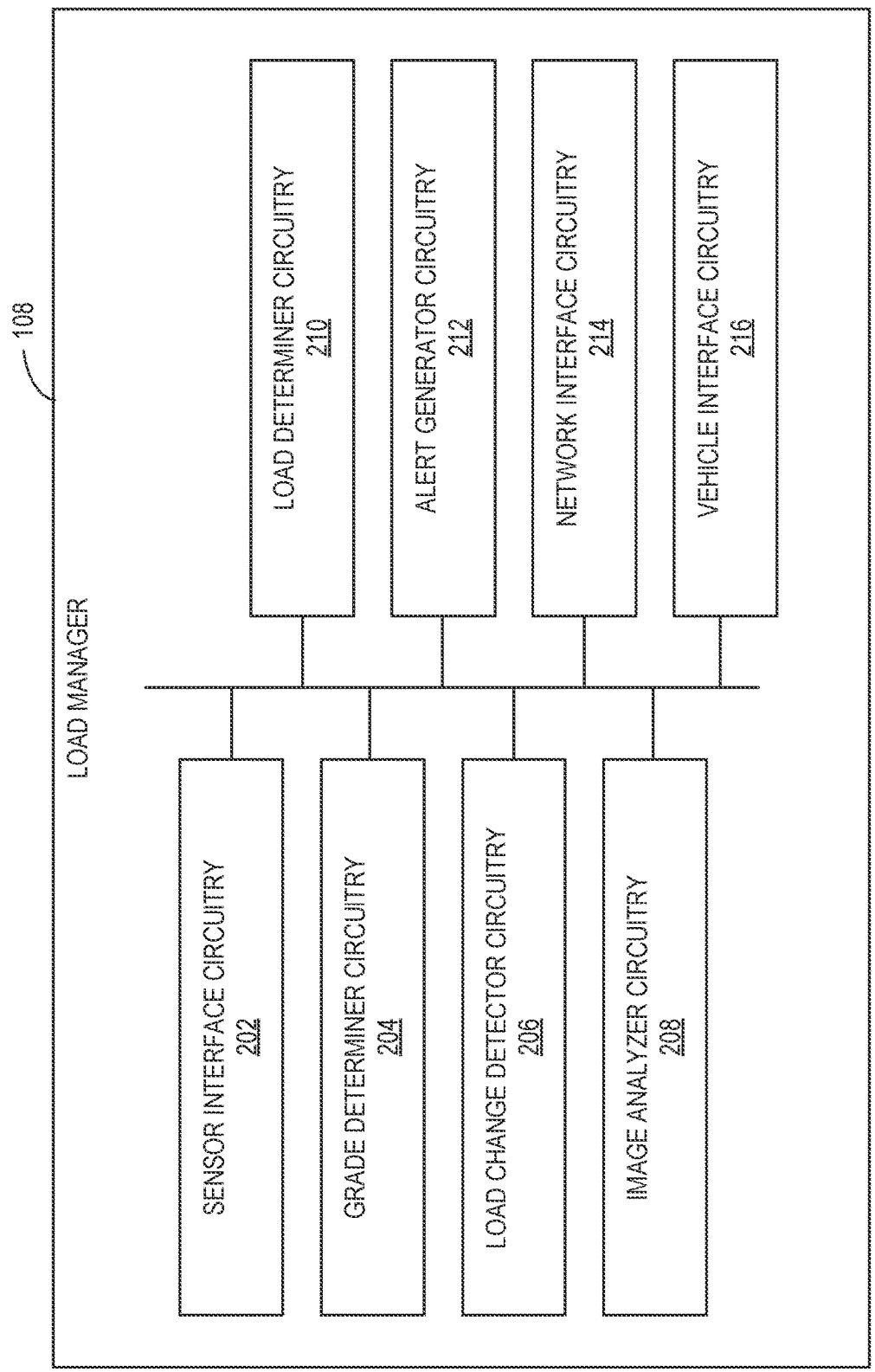
FIG. 2 is a block diagram of the load manager of FIG. 1.

FIG. 2 is a block diagram of the load manager 108 of FIG. 1. In the illustrated example of FIG. 1, the load manager 108 includes example sensor interface circuitry 202, example grade determiner circuitry 204, example load change detector circuitry 206, example image analyzer circuitry 208, example load determiner circuitry 210, example alert generator circuitry 212, example network interface circuitry 214, and example vehicle interface circuitry 216.

The sensor interface circuitry 202 receives data from the sensors of the vehicle 100, including the cameras 110, 112A, 112B. In some examples, the sensor interface circuitry 202 can convert the data received from the sensors into a numerical form (e.g., human readable, etc.). In some examples, the sensor interface circuitry 202 can extract still images from video feeds.

The grade determiner circuitry 204 determines the grade on which the vehicle 100 is disposed based on the information from the sensor interface circuitry 202. For example, the grade determiner circuitry 204 can compare the angle of the driving surface as viewed by the front-facing camera 112A and/or the rear-facing camera 112B. In some examples, the grade determiner circuitry 204 can determine the pitch of the vehicle 100 via a similar technique. In other examples, the grade determiner circuitry 204 can determine the grade of the driving surface of the vehicle and/or the pitch of the vehicle 100 by any other suitable means (e.g., other vehicle sensors, a user input, etc.).

The load change detector circuitry 206 detects load changes on the vehicle 100. For example, the load change detector circuitry 206 can, via the cameras 110, 112A, 112B, detect significant changes in the load on the vehicle 100. Additionally or alternatively, the load change detector circuitry 206 can detect a load change via a user input from the user interface 106 and/or a mobile device associated with a user. In other examples, the load change detector circuitry 206 can detect load changes by any other suitable means (e.g., other optical sensors, etc.).

Figure 5:
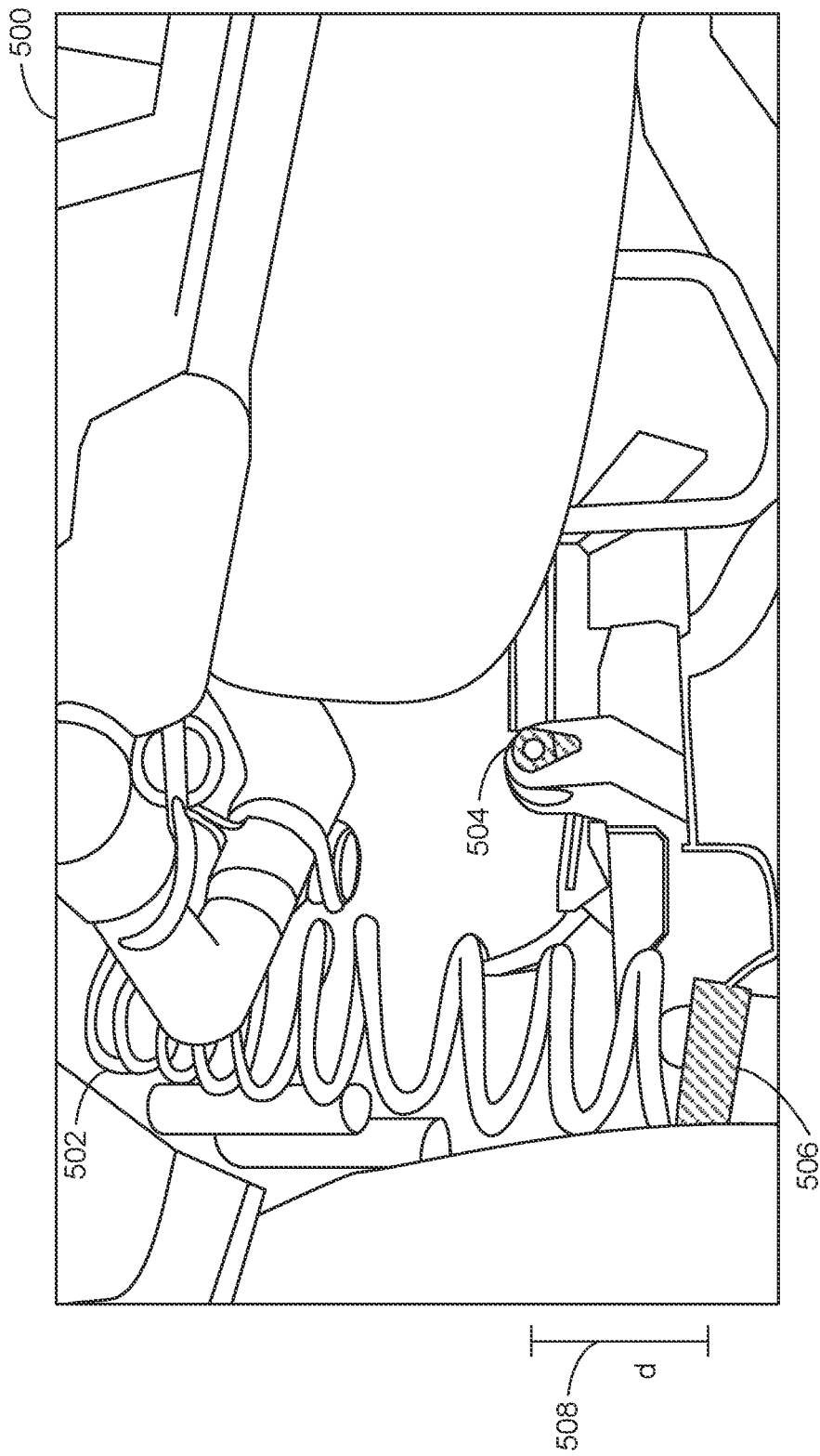
FIGS. 5 and 6 are illustrations of images captured using the underbody camera of FIG. 1.
Figure 6:
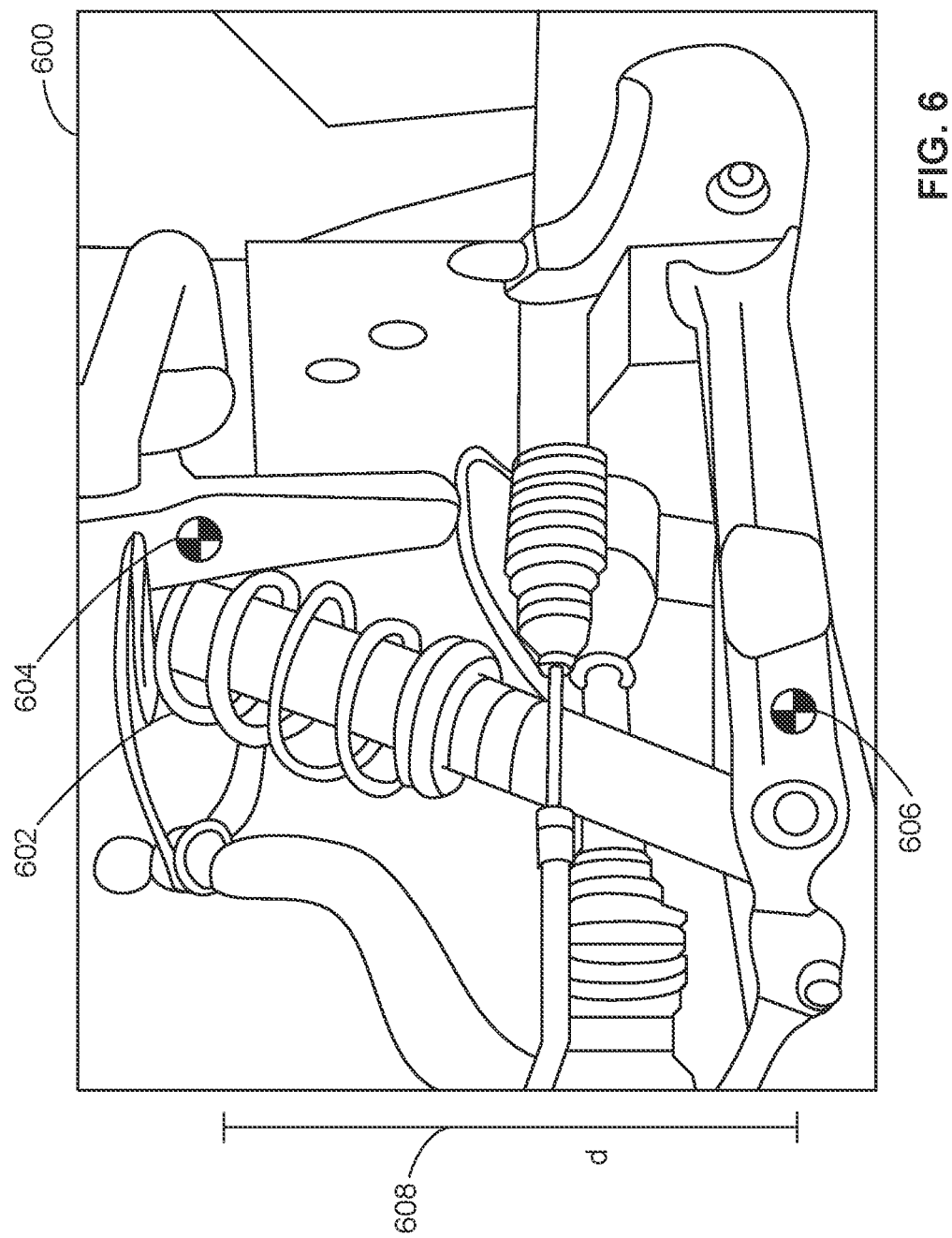

The image analyzer circuitry 208 compares images captured by the cameras 110, 112A, 112B to determine the relationship between features in the images. The image analyzer circuitry 208 can determine the change in the relative position of features common between captured images. For example, the image analyzer circuitry 208 can identify one or more visually identifiable features on the sprung mass of the vehicle 100 (e.g., a hitch ball, an element near one of the suspension components 104A, 104B, 104C, 104D, etc.) and/or an external feature adjacent to the vehicle 100. As used herein, the term "visually identifiable feature" refers to a physical feature of the vehicle 100 that can be readily and repeatedly identified in an image via machine vision techniques. In such examples, the image analyzer circuitry 208 can determine the change in the spatial relationship between identified features before the vehicle 100 was loaded and the identified features after the vehicle 100 was loaded. An example image showing a spatial relationship between a vehicle feature and an external feature is illustrated below in conjunction with FIGS. 3A, 3B, 8 and 9. Example images showing a spatial relationship between two vehicle features are illustrated in FIGS. 5 and 6. In some examples, the image analyzer circuitry 208 can apply post-processing and/or photogrammetry techniques to the captured images of the cameras 110, 112A, 112B to improve the fidelity of the images (e.g., increasing contrast, increasing brightness, anti-vignetting techniques, filters, etc.).

The load determiner circuitry 210 determines a load condition of the vehicle 100. For example, the load determiner circuitry 210 can determine the deflection of the suspension components 104A, 104B, 104C, 104D based on the data received from the cameras 110, 112A, 112B. For example, the load determiner circuitry 210 can determine a load carried by each of the suspension components 104A, 104B, 104C, 104D via the determined deflections and a look-up table correlating the deflection and the weight. In some such examples, the look-up table can be empirically generated during the manufacturing and calibration of the vehicle 100. In other examples, the look-up table can be received from the central server 116. In some such examples, the look-up table can be generated based on load data received from vehicles similar to the vehicle 100. In some such examples, the look-up tables can be generated, trained, and/or selected using artificial intelligence and/or machine learning systems. In some such examples, the load determiner circuitry 210 can select and/or update a look-up table based on data collected from the vehicle and/or vehicles similar to the vehicle 100, collected via the network 114 by the network interface circuitry 214, from vehicles similar to the vehicle 100 (e.g., vehicles of the same make/model of the vehicle 100, vehicles in similar wear conditions as the vehicle 100, vehicles in a similar environmental condition as the vehicle 100, etc.). In some such examples, the data from other vehicles can be used to provide a statistical convergence on the appropriate weight allowing the vehicle's look-up table(s) to be improved by updates from the network 114 (e.g., via an over-the-air (OTA) update, etc.). Additionally or alternatively, a transfer function/characteristic curve can be used to determine the vehicle load based on the deflections. In some such examples, the coefficients can be determined based on physical characteristic(s) of the suspension components 104A, 104B, 104C, 104D and/or during the calibration of the vehicle 100.

The alert generator circuitry 212 generates an alert to be presented to a user of the vehicle 100. For example, the alert generator circuitry 212 can generate an alert in response to determining the load condition of the vehicle 100 does not satisfy a threshold. In some examples, the threshold can correspond to the GAWR of the vehicle 100 and/or any other suitable weight capability of the vehicle 100. In some examples, the threshold can correspond to the weight distribution of the vehicle 100 (e.g., a percentage of the vehicle load carried by a specific one of the axles of the vehicle 100, a percentage of the vehicle load carried by a specific one of the wheels 102A, 102B, 102C, 102D, etc.). In some examples, the alert generator circuitry 212 is presented an alert via the user interface 106. In some examples, the alert generator circuitry 212 can generate a visual alert, an audio alert, and/or a tactile alert.

The network interface circuitry 214 interfaces the vehicle 100 with the network 114. For example, the network interface circuitry 214 can connect the vehicle 100 to the central server 116 to allow the vehicle 100 to send vehicle load information to the central server 116. Additionally or alternatively, the network interface circuitry 214 can enable the load manager 108 to access information from the central server 116.

The vehicle interface circuitry 216 interfaces with the other systems of the vehicle 100. In some examples, the vehicle interface circuitry 216 can change a performance characteristic of the vehicle 100 based on the load condition determined by the load determiner circuitry 210. For example, the vehicle interface circuitry 216 can change a stiffness and/or displacement of the suspension system of the vehicle 100. In other examples, the vehicle interface circuitry 216 can change any other suitable characteristic of the vehicle 100 (e.g., a braking torque gain, a power steering assistance, etc.).

While an example manner of implementing the load manager 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example grade determiner circuitry 204, the example load change detector circuitry 206, the example image analyzer circuitry 208, the example load determiner circuitry 210, the example alert generator circuitry 212, the example network interface circuitry 214, the example vehicle interface circuitry 216, and/or, more generally, the example load manager 108 of FIGS. 1 and 2, may be implemented by hardware alone or by hardware in combination with software and/or firmware. Thus, for example, any of the example sensor interface circuitry 202, the example grade determiner circuitry 204, the example load change detector circuitry 206, the example image analyzer circuitry 208, the example load determiner circuitry 210, the example alert generator circuitry 212, the example network interface circuitry 214, the example vehicle interface circuitry 216, and/or, more generally, the example load manager 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example load manager 108 of FIG. 1 may include one or more elements, processes, and/or devices in addition to, or instead of, those illustrated in FIG. 2, and/or may include more than one of any or all of the illustrated elements, processes and devices.

Figure 3A:
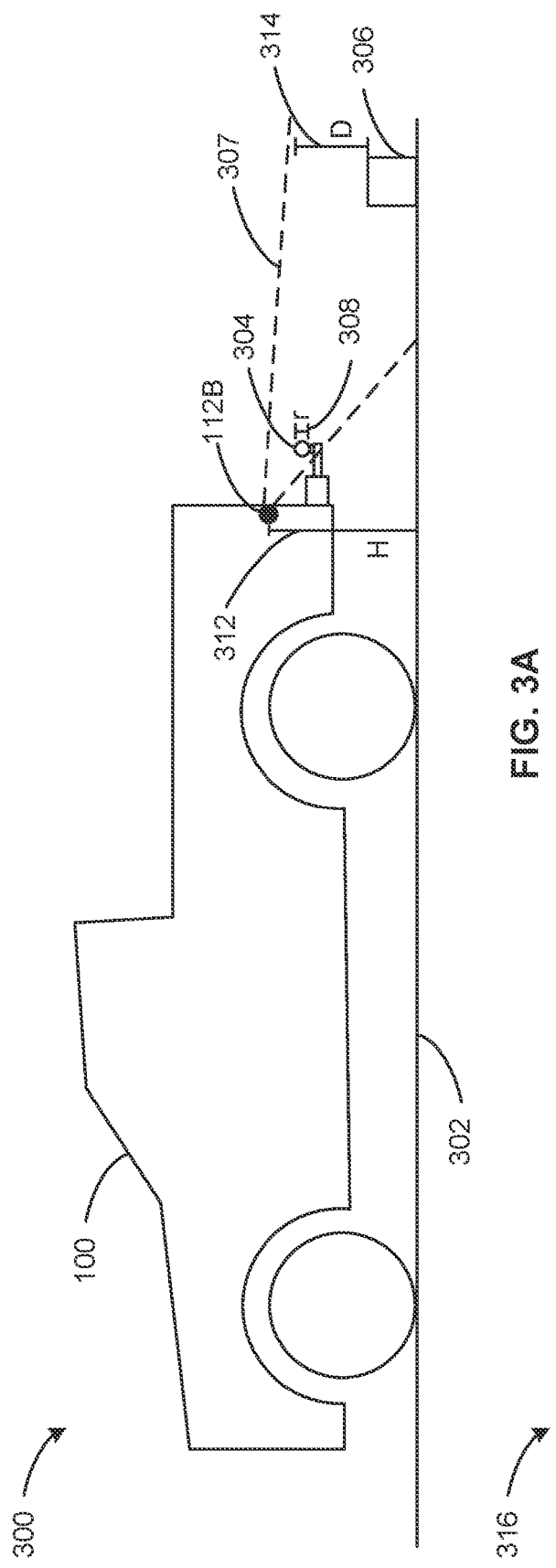
FIGS. 3A and 3B are an illustrations of a vehicle and associated frames captured using the external-facing camera of FIG. 1.

FIG. 3A is a simplified illustration of the vehicle 100 in an example pre-loaded state 300. In the illustrated example of FIG. 3A, the vehicle 100 is disposed on an example driving surface 302 and includes an example hitch ball 304. In the illustrated example of FIG. 3A, an example visually identifiable object 306 (e.g., an object including a visually identifiable feature, etc.) is disposed in an example view 307 of the rear-facing camera 112B. In the illustrated example of FIG. 3A, the hitch ball 304 has an example radius 308 (illustrated as "r" in FIGS. 3A and 3B), the vehicle 100 has an example ride height 312 (illustrated as "H" in FIG. 3A), and the hitch ball 304 has an example vertical displacement 314 from the visually identifiable object 306 (illustrated as D in FIG. 3A).

Figure 3B:
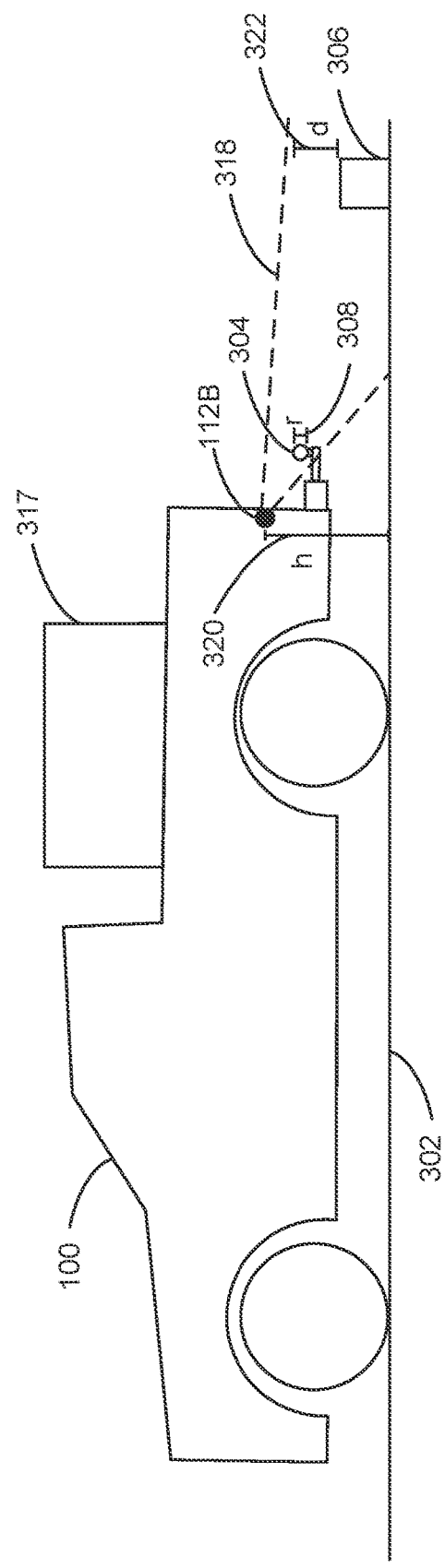

FIG. 3B is a simplified illustration of the vehicle 100 in an example post load state 316. In FIG. 3B, example cargo 317 has been loaded in the bed of the vehicle 100. The loading of the cargo 317 has caused to the suspension of the vehicle 100 to compress, thereby resulting in an example second ride height 320 (illustrated as "h" in FIG. 3B) and the hitch ball 304 relative to the object 306 has an example second vertical displacement 322 (illustrated as "d" in FIG. 3B).

The load manager 108 can determine the change between the first ride height 312 and the second ride height 320 (e.g., the difference between "H" and "h," etc.) based on the relative movement of an object rigidly coupled to and/or disposed on the sprung mass of the vehicle 100 (e.g., the hitch ball 304, etc.) and an external feature (e.g., the object 306, etc.) within the pre-loaded view 307 and a post-loaded view 318 of the camera 112B. For example, via geometric and/or trigonometric principles, the ratio of change of the vertical displacements 314, 322 can be correlated to the change in the ride heights 312, 320 (e.g., the difference between H and h is proportional to the difference between D and d, etc.).

The radius 308 of the hitch ball 304 can be input via a user input (e.g., as a direct measurement, as a model number of a hitch ball with a known radius, etc.) to the user interface 106. The known radius 308 of the hitch ball 304 enables the load manager 108 to determine the actual length of the vertical displacement 314 via pixel scaling and/or other photogrammetry techniques. In some examples, any other suitable visually identifiable feature coupled to and/or disposed on the sprung mass of the vehicle 100 via a known size can be used in place of the hitch ball 304. For example, an object loaded in the bed of the vehicle 100 with a known size (e.g., a bicycle wheel, etc.) can be used as the fixed feature. Additionally or alternatively, a different fixed feature (e.g., another part of a hitch of the vehicle 100, a feature of the bumper of the vehicle 100, etc.) and/or an indicium visible to the camera 112B can be used as the feature fixed (e.g., an indicium disposed on the bumper of the vehicle 100, etc.).

In the illustrated example of FIGS. 3A and 3B, the visually identifiable object 306 is a physical object that is recognizable by the camera 112B (e.g., another vehicle, a traffic control feature, etc.). In other examples, the visually identifiable object 306 can be any suitable stationary feature (e.g., a feature disposed on the driving surface 302 or another surface, an indicium marked on the driving surface 302 or another surface, etc.). Additionally or alternatively, the visually identifiable object 306 can be absent. In such examples, the driving surface 302 can be used as a visual reference.

In some examples, the loading of the cargo 317 can cause one or more of the suspension components of the vehicle 100 (e.g., one of the suspension components 104A, 104B, 104C, 104D of FIG. 1, etc.) to compress comparatively more than the other suspension components. In some such examples, the load manager 108 (e.g., the grade determiner circuitry 204, etc.) can determine the pitch of the vehicle 100 and/or the roll of the vehicle 100 caused by the uneven loading of the vehicle 100. In some examples, the load manager 108 can factor the determined pitch and/or the roll of the vehicle 100 into determining the load on the vehicle 100 (e.g., as an additional input for a look-up table correlating ride height to vehicle load, etc.). In other examples, the load manager 108 can alert a user that the uneven loading prevents load determination via photometry.

Figure 4:
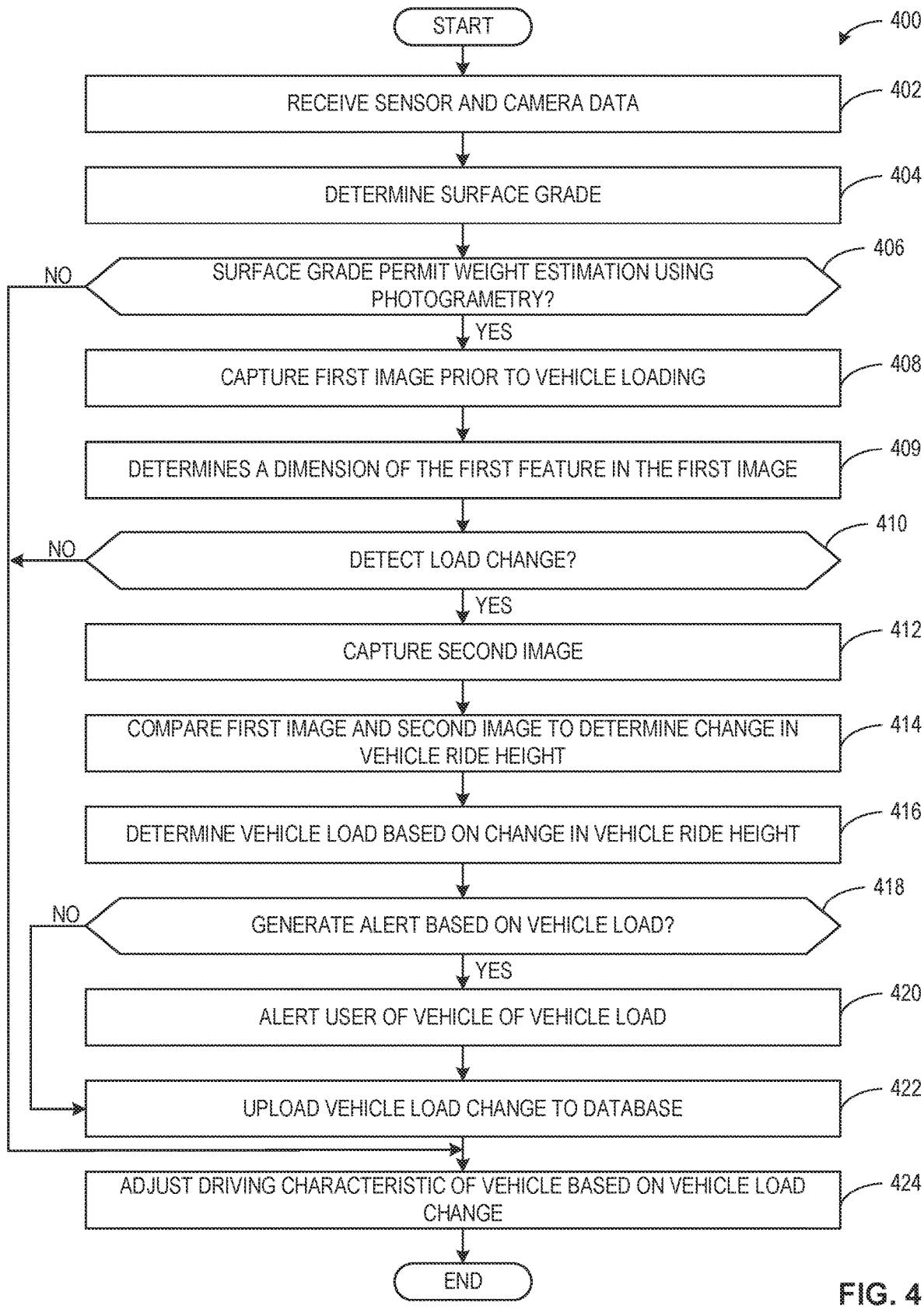
FIG. 4 is a first flowchart representative of example machine readable instructions and/or example operations that may be executed by example processor circuitry to implement the load manager of FIG. 2.
Figure 7:
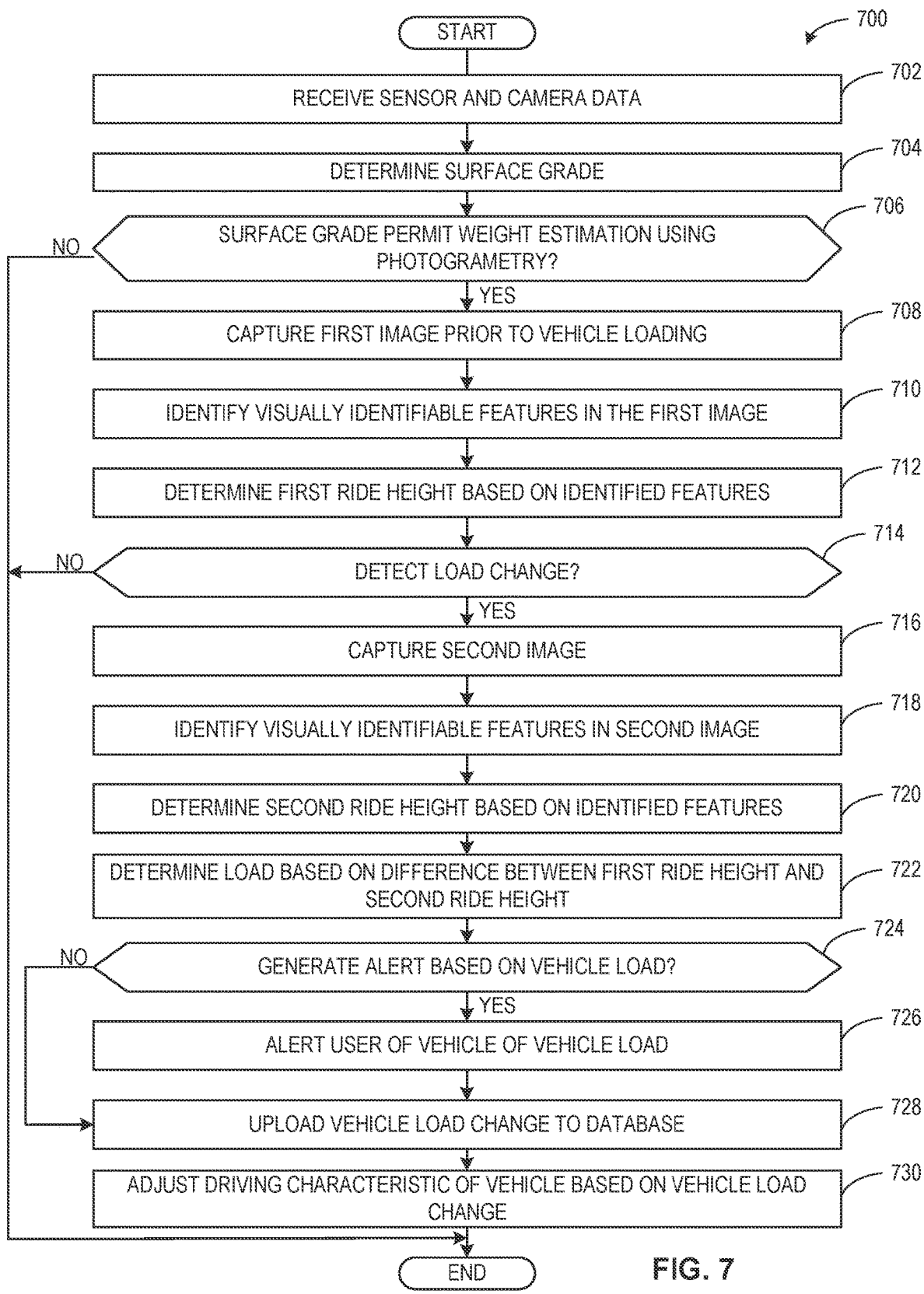
FIG. 7 is a second flowchart representative of example machine readable instructions and/or example operations that may be executed by example processor circuitry to implement the load manager of FIG. 2.
Figure 11:
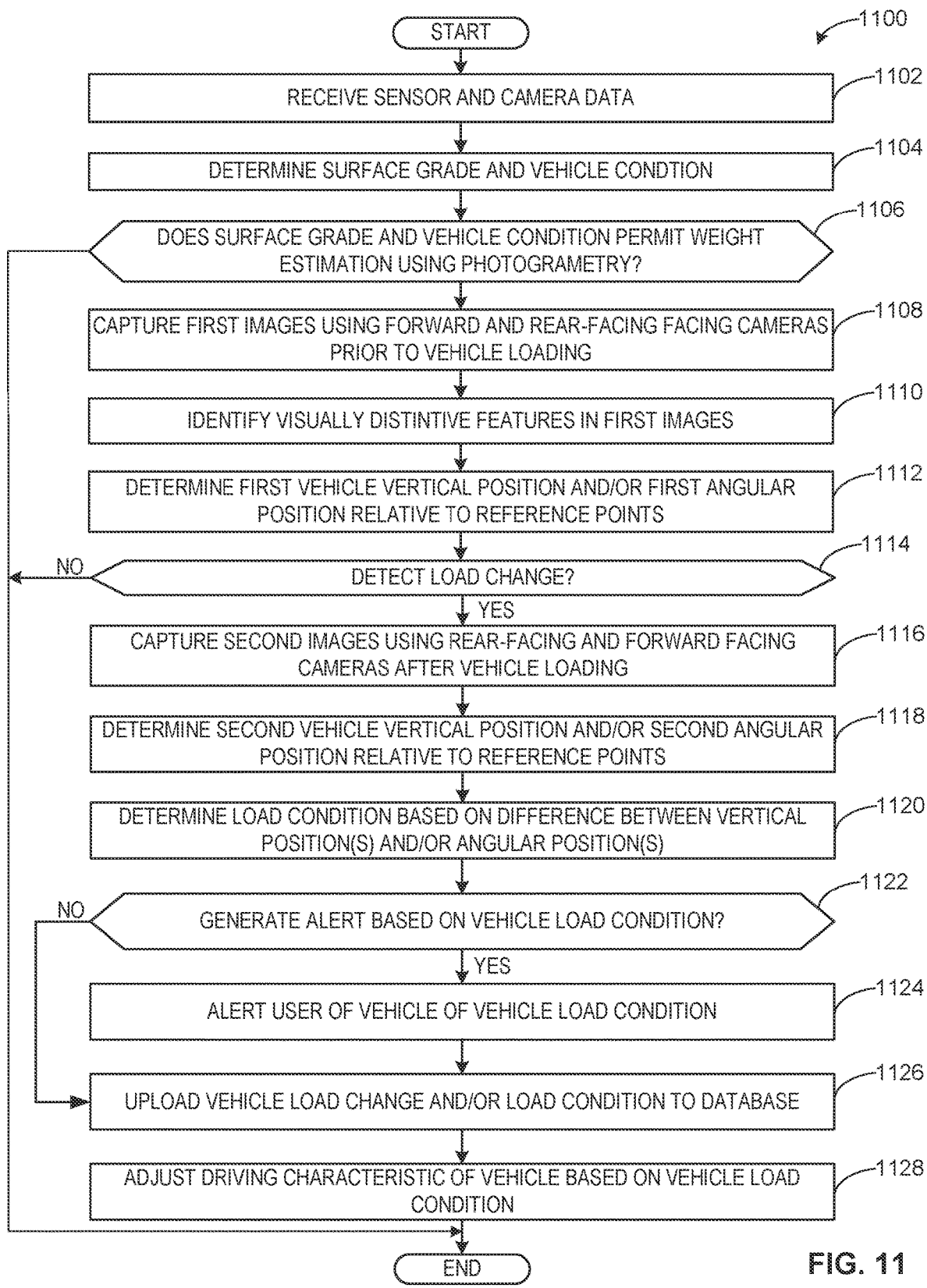
FIG. 11 is a third flowchart representative of example machine readable instructions and/or example operations that may be executed by example processor circuitry to implement the load manager of FIG. 2.

Flowcharts representative of example hardware logic circuitry, machine readable instructions, hardware implemented state machines, and/or any combination thereof for implementing the load manager 108 of FIG. 2 are shown in FIGS. 4, 7, and 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4, 7, and 11, many other methods of implementing the example load manager 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4, 7, and 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to determine a vehicle load using the front-facing camera 112A and rear-facing camera 112B. The machine readable instructions and/or the operations 400 of FIG. 4 begin at block 402, at which the sensor interface circuitry 202 receives sensor and camera data. For example, the sensor interface circuitry 202 can receive data from the sensors of the vehicle 100, including the cameras 112A, 112B. In some examples, the sensor interface circuitry 202 can convert the data received from the sensors into a numerical form (e.g., human readable, etc.).

At block 404, the grade determiner circuitry 204 determines the surface grade. For example, the grade determiner circuitry 204 can determine the grade on which the vehicle 100 is disposed based on the information from the cameras 112A, 112B. For example, the grade determiner circuitry 204 can compare the angle of the driving surface as viewed by the front-facing camera 112A and/or the rear-facing camera 112B. In some examples, the grade determiner circuitry 204 can determine the pitch of the vehicle 100 via a similar technique. In other examples, the grade determiner circuitry 204 can determine the grade of the driving surface and/or the pitch of the vehicle 100 by any other suitable means.

At block 406, the grade determiner circuitry 204 determines if the surface grade permits weight estimation using photogrammetry. For example, the grade determiner circuitry 204 can compare the determined grade to a threshold grade to determine if photogrammetry can be used to determine the weight of the vehicle 100. In some examples, the grade determiner circuitry 204 can use a threshold grade that is empirically determined. In other examples, the grade determiner circuitry 204 can use a threshold grade determined by any other suitable metric (e.g., determined based on environmental factors, user input, etc.). If the grade determiner circuitry 204 determines the surface grade is suitable for weight estimation using photogrammetry, the operations 400 advance to block 408. If the grade determiner circuitry 204 determines the surface grade is not suitable for weight estimation using photogrammetry, the operations 400 end.

At block 408, the sensor interface circuitry 202 captures a first image prior to loading the vehicle 100. For example, the sensor interface circuitry 202 can capture a first image via the front-facing camera 112A and/or the rear-facing camera 112B. In other examples, the sensor interface circuitry 202 can capture the first image by any other suitable means.

At block 410, the load change detector circuitry 206 determines if a load change has been detected. For example, the load change detector circuitry 206 can, via the cameras 110, 112A, 112B, detect significant changes in the load on the vehicle 100. Additionally or alternatively, the load change detector circuitry 206 can detect a load change via a user input for the user interface 106 and/or a mobile device associated with a user. In other examples, the load change detector circuitry 206 can detect load changes by any other suitable means (e.g., other optical sensors, etc.). If the load change detector circuitry 206 detects a load change, the operations 400 advance to block 412. If the load change detector circuitry 206 does not detect a load change, the operations 400 end.

At block 409, the image analyzer circuitry 208 determines a dimension of the first feature in the first image. For example, the image analyzer circuitry 208 can, via a user interface 106, prompt a user of the vehicle 100 to input a dimension of an identified feature in the first image (e.g., the radius of the hitch ball 304 of FIGS. 3A-3B, the size of an identified feature loaded in the bed of a vehicle, etc.). In some such examples, the image analyzer circuitry 208 can prompt a user to input a specification and/or name of the identified first feature and then determine the dimension based on the specification and/or name (e.g., via the network 114, etc.). Additionally or alternatively, the image analyzer circuitry 208 can extract the dimensions of the first features from a memory associated with the vehicle 100.

At block 412, the sensor interface circuitry 202 captures a second image prior to loading the vehicle 100. For example, the sensor interface circuitry 202 can capture a second image via the front-facing camera 112A and/or the rear-facing camera 112B. In other examples, the sensor interface circuitry 202 can capture the second image by any other suitable means.

At block 414, the image analyzer circuitry 208 compares the first and second images to determine a change in the vehicle ride height. For example, the image analyzer circuitry 208 can compare first and second images to determine the relationship between features in the images. The image analyzer circuitry 208 can determine the change in the relative position of features common between captured images. For example, the image analyzer circuitry 208 can identify one or more visually identifiable features on the sprung mass of the vehicle 100 (e.g., a hitch ball, an item loaded in the bed of the vehicle 100, an adhered indicium, a machined indicium, etc.) and/or an external feature adjacent to the vehicle 100. In such examples, the image analyzer circuitry 208 can determine the change in the spatial relationship between identified features before the vehicle 100 was loaded and the identified features after the vehicle 100 was loaded.

At block 416, the load determiner circuitry 210 determines the vehicle load based on the change in the vehicle ride height. For example, the load determiner circuitry 210 can determine the deflection of the suspension components 104A, 104B, 104C, 104D based on the sensor data received from the cameras 110, 112A, 112B. For example, the load determiner circuitry 210 can determine a load carried by each of the suspension components 104A, 104B, 104C, 104D via the determined deflections and a look-up table correlating the deflection and the total vehicle weight. In some such examples, the look-up table can be empirically generated during the manufacturing and calibration of the vehicle 100. In other examples, the look-up table can be received from the central server 116. In some such examples, the look-up table can be generated based on load data received from vehicles similar to the vehicle 100. Additionally or alternatively, a transfer function/characteristic curve can be used to determine the vehicle load based on the deflections. In some such examples, the coefficients can be determined based on a physical characteristic (e.g., a spring rate, a stiffness, etc.) of the suspension components 104A, 104B, 104C, 104D and/or during the calibration of the vehicle 100.

At block 418, the alert generator circuitry 212 determines if an alert is to be generated based on the load. For example, the alert generator circuitry 212 can generate an alert in response to determining the load condition of the vehicle 100 does not satisfy a threshold. In some examples, the threshold can correspond to the GAWR of the vehicle 100 and/or any other suitable weight capacity of the vehicle 100. In some examples, the threshold can correspond to the weight distribution of the vehicle 100 (e.g., a percentage of the vehicle load carried by a specific one of the axles of the vehicle 100, a percentage of the vehicle load carried by a specific one of the wheels 102A, 102B, 102C, 102D, etc.). If the alert generator circuitry 212 determines an alert should be generated, the operations 400 advance to block 420. If the alert generator circuitry 212 determines an alert should not be generated, the operations 400 advance to block 422.

At block 420, the alert generator circuitry 212 generates an alert. For example, the alert generator circuitry 212 can generate an alert to be presented via the user interface 106. In some examples, the alert generator circuitry 212 can generate a visual alert, an audio alert, and/or a tactile alert. Additionally or alternatively, the alert generator circuitry 212 can generate an alert by any other suitable means.

At block 422, the network interface circuitry 214 uploads information related to the load change to the central server 116. For example, the network interface circuitry 214 can send information (e.g., the recorded ride height change, the determined load, the environmental conditions, etc.) to the central server 116 via the network 114. In other examples, the network interface circuitry 214 can send the information to the central server 116 by any other suitable means. In some examples, the data in the central server 116 can be used (e.g., by a manufacturer of the vehicle 100, etc.) to generate updated look-up tables for the vehicle 100 and/or vehicles similar to the vehicle 100. In some examples, the execution of block 422 can be omitted. In such examples, the network interface circuitry 214 can store the information in a local memory of the vehicle 100 (e.g., the memory 1214, 1216, 1228 of FIG. 12, etc.) and/or discard the information.

At block 424, the vehicle interface circuitry 216 adjusts the driving characteristics of the vehicle 100 based on the vehicle load change. For example, the vehicle interface circuitry 216 can change a stiffness and/or displacement of the suspension system of the vehicle 100. In other examples, the vehicle interface circuitry 216 can change any other suitable characteristic of the vehicle 100 (e.g., a braking torque gain, a power steering assistance, etc.).

FIG. 5 is a simplified illustration of an example first image 500 captured by an underbody camera (e.g., the underbody camera 110 of FIG. 1, etc.). In the illustrated example of FIG. 5, the first image 500 includes an example suspension component 502 (e.g., the third suspension component 104C of FIG. 1, etc.), a first visually identifiable feature 504 and a second visually identifiable feature 506. In some examples, prior to capturing the first image 500, the orientation of the capturing camera is adjusted to ensure the visually identifiable features 504, 506 are visible in the frame of the capturing camera. For example, the underbody cameras of a vehicle are often oriented to view features of the driving surfaces to alert an operator of the vehicle when objects of the driving surface could damage the underbody components of the vehicle. In such examples, during vehicle loading, the capturing camera can rotate to ensure the visual features can be viewed by the capturing camera.

In the illustrated example of FIG. 5, the first visually identifiable feature 504 is a feature coupled to the sprung mass of the vehicle. In the illustrated example of FIG. 5, the first visually identifiable feature 504 is a bolt on the track bar (e.g., a bolt, etc.) and the second visually identifiable feature 506 is the spring seat of the suspension component 502. In other examples, the visually identifiable features 504, 506 can be any suitable features in the first image 500. For example, the first visually identifiable feature 504 can be any suitable element of a feature of an axle of the vehicle, a feature of the powertrain, a feature of the frame, etc. For example, the second visually identifiable feature 506 can be any suitable feature of the wheels, the suspension, etc.

After identifying the visually identifiable features 504, 506, the load manager 108 of FIGS. 1 and 2 can determine the spatial relationship between the visually identifiable features 504, 506. For example, the load manager 108 can determine an example vertical displacement 508 based on a number of pixels between the visually identifiable features 504, 506. In some such examples, because the dimensions of the visually identifiable features 504, 506 are known (e.g., the components associated with the visually identifiable features 504, 506 have designed dimensions that can be input by the manufacturer of the vehicle 100 and/or operator of the vehicle 100, etc.), the load manager 108 can determine the actual length of the vertical displacement using pixel scaling. In other examples, the load manager 108 can determine the distance between the visually identifiable features 504, 506 by any other suitable metric (e.g., absolute displacement, etc.). The load manager 108 can determine the ride height of the vehicle based on the spatial relationship of the visually identifiable features 504, 506 (e.g., via geometry, via a look-up table, etc.).

FIG. 6 is a simplified illustration of an example second image 600 captured by an underbody camera (e.g., the underbody camera 110 of FIG. 1, etc.). In the illustrated example of FIG. 6, the second image 600 includes an example suspension component 602 (e.g., the third suspension component 104C of FIG. 1, etc.), an example first visually identifiable feature 604 and an example second visually identifiable feature 606. Like the first image 500 of FIG. 5, the capturing camera of the second image 600 can reorientate from an initial position to capture the second image 600.

In the illustrated example of FIG. 6, the first visually identifiable feature 604 is a feature associated with the sprung mass of the vehicle and the second visually identifiable feature 606 is associated with the unsprung mass of the vehicle. In the illustrated example of FIG. 6, the visually identifiable features 604, 606 are targets that have been disposed (e.g., adhered, fastened, painted, etc.) onto the vehicle. Additionally or alternatively, the visually identifiable features 604, 606 can be mechanically added (e.g., machined, etched, etc.) to the components of the vehicle. In some examples, the visually identifiable features 604, 606 can include reflectors, high-contrast colors, and/or other features that facilitate the identification of the visually identifiable features 604, 606 via machine vision techniques.

After identifying the visually identifiable features 604, 606, the load manager 108 of FIGS. 1 and 2 can determine the spatial relationship between visually identifiable features 604, 606. For example, the load manager 108 can determine an example vertical displacement 608 based on a number of pixels between the visually identifiable features 604, 606. In some such examples, because the dimensions of the visually identifiable features 604, 606 are known (e.g., the size/dimensions of the added features 604, 606 are pre-determined, etc.), the load manager 108 can determine the actual length of the vertical displacement 608 using pixel scaling. In other examples, the load manager 108 can determine the distance between the visually identifiable features 604, 606 by any other suitable metric (e.g., absolute displacement, etc.). The load manager 108 can determine the ride height of the vehicle based on the spatial relationship of the visually identifiable features 604, 606 (e.g., via geometry, via a look-up table, etc.).

While the suspension components 502, 602 of FIGS. 5 and 6 are visible in the images 500, 600, respectively, the suspension components 502, 602 need not be visible for the teachings disclosed herein to function. Instead, any image that includes a visually identifiable feature of the vehicle on the sprung mass and a visually identifiable feature on the unsprung mass is suitable to determine the ride height change of the vehicle 100.

FIG. 7 is a flowchart representative of example machine readable instructions and/or example operations 700 that may be executed and/or instantiated by processor circuitry to determine a vehicle load using the underbody camera 110. The machine readable instructions and/or the operations 700 of FIG. 7 begin at block 702, at which the sensor interface circuitry receives sensor data, including camera data. For example, the sensor interface circuitry 202 can receive data from the sensors of the vehicle 100, including the cameras 110, 112A, 112B. In some examples, the sensor interface circuitry 202 can convert the data received from the sensors into a numerical form (e.g., human readable, etc.).

At block 704, the grade determiner circuitry 204 determines the surface grade. For example, the grade determiner circuitry 204 can determine the grade the vehicle 100 is disposed on based on the information from the cameras 112A, 112B. For example, the grade determiner circuitry 204 can compare the angle of the driving surface as viewed by the front-facing camera 112A and/or the rear-facing camera 112B. In some examples, the grade determiner circuitry 204 can determine the pitch of the vehicle 100 via a similar technique. In other examples, the grade determiner circuitry 204 can determine the grade of the driving surface of the vehicle and/or the pitch of the vehicle 100 by any other suitable means.

At block 706, the grade determiner circuitry 204 determines if the surface grade permits weight estimation using photogrammetry. For example, the grade determiner circuitry 204 can compare the determined grade to a threshold grade to determine if photogrammetry can be used to determine the weight of the vehicle 100. In some examples, the grade determiner circuitry 204 can use a threshold grade that is empirically determined. In other examples, the grade determiner circuitry 204 can use a threshold grade determined by any other suitable metric (e.g., determined based on environmental factors, user input, etc.). If the grade determiner circuitry 204 determines the surface grade is suitable for weight estimation using photogrammetry, the operations 700 advance to block 708. If the grade determiner circuitry 204 determines the surface grade is not suitable for weight estimation using photogrammetry, the operations 700 end.

At block 708, the sensor interface circuitry 202 captures a first image prior to loading the vehicle 100. For example, the sensor interface circuitry 202 can capture a first image via the underbody camera 110. In some examples, prior to capturing the first image, the vehicle interface circuitry 216 and/or the sensor interface circuitry 202 can adjust the orientation of the camera 110 to enable the imaging of the underbody of the vehicle 100 (e.g., from a first position pointing at the driving surface to a second position pointing at the components of the vehicle 100, etc.). In other examples, the sensor interface circuitry 202 can capture the first image by any other suitable means.

At block 710, the image analyzer circuitry 208 identifies visually identified features in first image. For example, the image analyzer circuitry 208 can identify distinctive components of the vehicle 100 (e.g., the visually identifiable features 504, 506 of FIG. 5, etc.) and/or indicium disposed on the vehicle 100 (e.g., the visually identifiable features 604, 606 of FIG. 6, etc.). For example, the image analyzer circuitry 208 can identify visually identifiable features via machine vision techniques. In other examples, the image analyzer circuitry 208 can identify visually features by any suitable means.

At block 712, the image analyzer circuitry 208 determines a first ride height based on identified features. For example, the image analyzer circuitry 208 can identify the vertical displacement between the identified visual features (e.g., the vertical displacement 508 of FIG. 5, the vertical displacement 608 of FIG. 6, etc.) using the known size of the identified features and pixel scaling. In some such examples, the first ride height can be determined based on the determined vertical displacement via geometry and/or a look-up table. In other examples, the image analyzer circuitry 208 can determine the first ride height based on any other suitable technique.

At block 714, the load change detector circuitry 206 determines if a load change has been detected. For example, the load change detector circuitry 206 can, via the cameras 110, 112A, 112B, detect significant changes in the load on the vehicle 100. Additionally or alternatively, the load change detector circuitry 206 can detect a load change via a user input via the user interface 106 and/or a mobile device associated with a user. In other examples, the load change detector circuitry 206 can detect load changes by any other suitable means (e.g., other optical sensors, etc.). If the load change detector circuitry 206 detects a load change, the operations 700 advance to block 716. If the load change detector circuitry 206 does not detect a load change, the operations 700 end.

At block 716, the sensor interface circuitry 202 captures a second image. For example, the sensor interface circuitry 202 can capture a second image via the underbody camera 110. In other examples, the sensor interface circuitry 202 can capture the first image by any other suitable means. In some examples, after capturing the second image, the vehicle interface circuitry 216 and/or the sensor interface circuitry 202 can adjust the orientation of the camera 110 to return to the position the camera 110 had prior to execution of block 710 and/or the operations 700.

At block 718, the image analyzer circuitry 208 identifies the visually identifiable features in the second image. For example, the image analyzer circuitry 208 can identify components of the vehicle 100 that were identified during the execution of block 710. For example, the image analyzer circuitry 208 can identify visually identifiable features via machine vision techniques. In other examples, the image analyzer circuitry 208 can identify visually identifiable features by any suitable means.

At block 720, the image analyzer circuitry 208 determine a second ride height based on identified features. For example, the image analyzer circuitry 208 can identify the vertical displacement between the identified visual features (e.g., the vertical displacement 508 of FIG. 5, the vertical displacement 608 of FIG. 6, etc.) using the known size of the identified features and pixel scaling. In some such examples, the second ride height can be determined based on the determined vertical displacement via geometry and/or a look-up table. In other examples, the image analyzer circuitry 208 can determine the second ride height based on any other suitable technique.

At block 722, the load determiner circuitry 210 determines the vehicle load based on the change in the vehicle ride height. For example, the load determiner circuitry 210 can determine the change in deflection of the suspension components 104A, 104B, 104C, 104D based on the sensor data received from the cameras 110, 112A, 112B. For example, the load determiner circuitry 210 can determine a load carried by each of the suspension components 104A, 104B, 104C, 104D via the determined deflections and a look-up table correlating the deflection and the weight. In some such examples, the look-up table can be empirically generated during the manufacturing and calibration of the vehicle 100. In other examples, the look-up table can be received from the central server 116. In some such examples, the look-up table can be generated based on load data received from vehicles similar to the vehicle 100. Additionally or alternatively, a transfer function/characteristic curve can be used to determine the vehicle load based on the deflections. In some such examples, the coefficients can be determined based on a physical characteristic of the suspension components 104A, 104B, 104C, 104D and/or during the calibration of the vehicle 100.

At block 724, the alert generator circuitry 212 determines if an alert is to be generated based on the load. For example, the alert generator circuitry 212 can generate an alert in response to determining the load condition of the vehicle 100 does not satisfy a threshold. In some examples, the threshold can correspond to the GAWR of the vehicle 100 and/or any other suitable weight capability of the vehicle 100. In some examples, the threshold can correspond to the weight distribution of the vehicle 100 (e.g., a percentage of the vehicle load carried by a specific one of the axles of the vehicle 100, a percentage of the vehicle load carried by a specific one of the wheels 102A, 102B, 102C, 102D, etc.). If the alert generator circuitry 212 determines an alert should be generated, the operations 700 advance to block 726. If the alert generator circuitry 212 determines an alert should not be generated, the operations 700 advance to block 728.

At block 726, the alert generator circuitry 212 generates an alert. For example, the alert generator circuitry 212 can generate an alert to be presented via the user interface 106. In some examples, the alert generator circuitry 212 can generate a visual alert, an audio alert, and/or a tactile alert. Additionally or alternatively, the alert generator circuitry 212 can generate by any other suitable means.

At block 728, the network interface circuitry 214 uploads information related to the load change to the central server 116. For example, the network interface circuitry 214 can send information (e.g., the recorded ride height change, the determined load, the environmental conditions, etc.) to the central server 116 via the network 114. In other examples, the network interface circuitry 214 can send the information to the database by any other suitable means. In some examples, the data in the central server 116 can be used (e.g., by a manufacturer of the vehicle 100, etc.) to generate updated look-up tables. In some examples, the execution of block 722 can be omitted. In such examples, the network interface circuitry 214 can store the information in a local memory of the vehicle 100 (e.g., the memory 1214, 1216, 1228 of FIG. 12, etc.) and/or discard the information.

At block 730, the vehicle interface circuitry 216 adjusts the driving characteristics of the vehicle 100 based on the vehicle load change. For example, vehicle interface circuitry 216 can change a stiffness and/or displacement of the suspension system of the vehicle 100. In other examples, the vehicle interface circuitry 216 can change any other suitable characteristic of the vehicle 100 (e.g., a braking torque gain, a power steering assistance, etc.).

Figure 8:
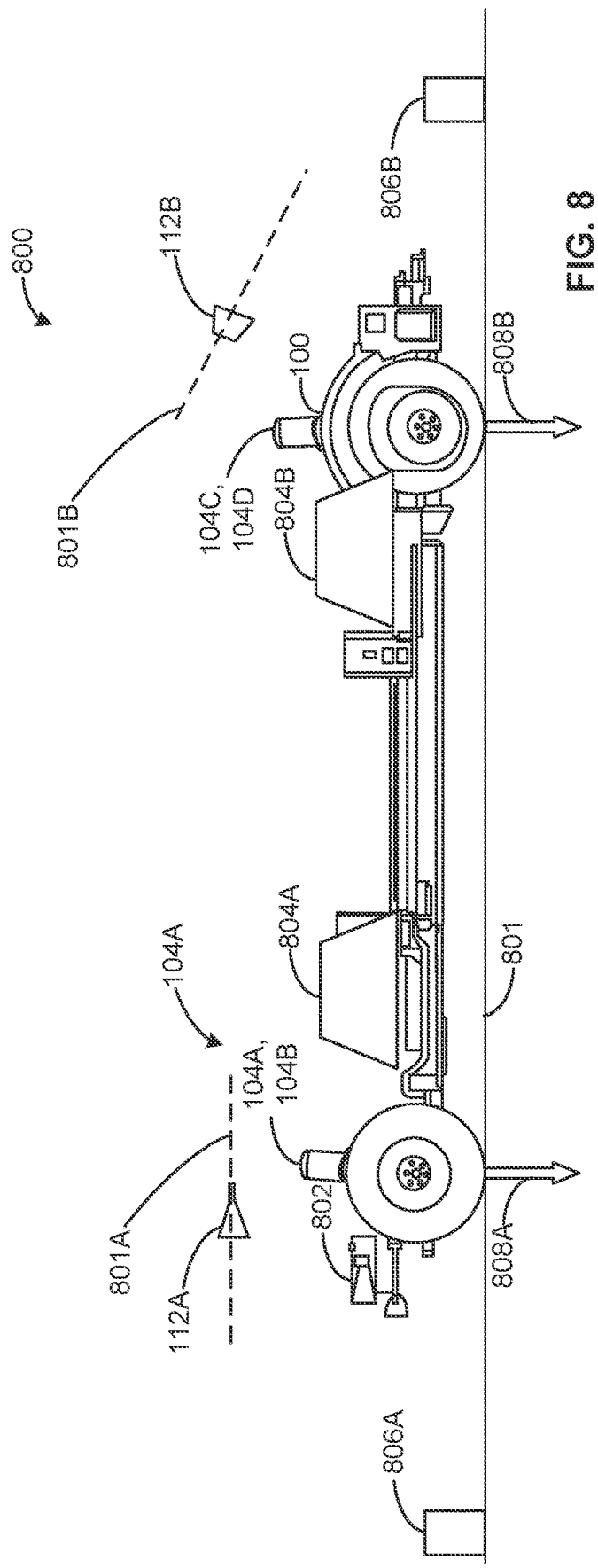
FIG. 8 is a side view of a vehicle showing the vehicle of FIG. 1 undergoing a load and the corresponding orientation of the vehicle cameras.

FIG. 8 is a side view of a vehicle 100 showing the vehicle of FIG. 1 in an example load condition 800 disposed on an example driving surface 801. In the illustrated example of FIG. 8, the vehicle 100 includes the suspension components of 104A, 104B, 104C, 104D and the cameras 112A, 112B of FIG. 1, which have an example first optical centerline 801A and an example second optical centerline 801B, respectively. In the illustrated example of FIG. 8, the vehicle 100 includes an example headlamp 802 and is being loaded by an example first object 804A and an example second object 804B. In the illustrated example of FIG. 8, an example first visually identifiable feature 806A is disposed in the view of the front-facing camera 112A and an example second visually identifiable feature 806B is disposed in the view of the rear-facing camera 112B.

In some examples, the grade of the driving surface 801 can be determined via the cameras 112A, 112B. For example, the load manager 108 can, based on the relative angles between the optical centerlines 801A, 801B and the driving surface 801, determine the grade of the driving surface 801. In the illustrated example of FIG. 8, the driving surface is flat (e.g., the grade is 0, etc.). In other examples, if the surface grade does not satisfy a grade threshold, the ability to determine the load on the vehicle 100 via photometry techniques may be inhibited (e.g., deflection of the suspension is primarily caused by the high grade, the geometric location of the features 806A, 806B is difficult to locate, etc.). In some such examples, the load manager 108 (e.g., the alert generator circuitry 212, etc.) can issue a notification that the grade of the driving surface 801 prevents the determination of the load via photometry techniques. In some examples, the load manager 108 can also verify if the vehicle 100 is not in motion (e.g., has a velocity of zero, etc.) and that the steered wheels (e.g., the wheels 102A, 102B, etc.) are in a straight-forward position.

In some examples, the vehicle 100 can include an auto headlamp system (e.g., an adaptive headlamp system, etc.) for the headlamp 802. For example, the headlamp 802 can include an actuator that permits the orientation of the headlamp to be rotated about the vertical and horizontal axis of the vehicle 100 to ensure that relevant features of the driving surface 801 are illuminated. For example, the orientation of the headlamps can be changed if the driving surface 801 has a high grade, the vehicle is undergoing a turn, the vehicle is going over a speedbump, etc. In some examples, the orientation of the camera 112A can be adjusted along with the orientation of the headlamp 802 via the adaptive headlamp system. An example diagram showing the adjustment of the self-leveling system is a description below in conjunction with FIG. 10.

The load manager 108 can determine the magnitude of loads 808A, 808B on the vehicle 100 based on a change in deflection of the suspension components 104A, 104B, 104C, 104D based on the relative movement of the features 806A, 806B within the optical centerlines 801A, 801B, respectively, of the cameras 112A, 112B. For example, via geometric and/or trigonometric principles, the movement of the features 806A, 806B within the optical centerlines 801A, 801B can correlate with a change in the deflection of the suspension components 104A, 104B, 104C, 104D. In some examples, the use of both of the cameras 112A, 112B permits the determination of change in suspension deflection of the suspension components 104A, 104B, 104C, 104D without viewing a feature with a known geometry (e.g., the hitch ball 304 of FIGS. 3A, 3B, etc.). In some such examples, the comparative magnitude of the movement of the features 806A, 806B within the optical centerlines 801A, 801B between the preloaded state and the loaded state can be used to estimate the magnitude of the deflection of the suspension components 104A, 104B, 104C, 104D. In some examples, the rotation of the vehicle 100 can similarly be determined based on the deflection of the suspension components 104A, 104B, 104C, 104D. An example including determining the rotation of the vehicle 100 based on an applied load is described below in conjunction with FIG. 9.

In some examples, the vehicle 100 can include other sensors (e.g., optical sensors, radar, ultrasonic sensors, sonic sensors, etc.) that can be used to identify the location of the first feature 806A and/or the second feature 806B. In such examples, these supplemental sensors (not illustrated) can be used in addition or in conjunction with cameras 112A, 112B to determine the relative locations of the features 806A, 806B before and after the objects 804A, 804B have been disposed on the vehicle 100.

Figure 9:
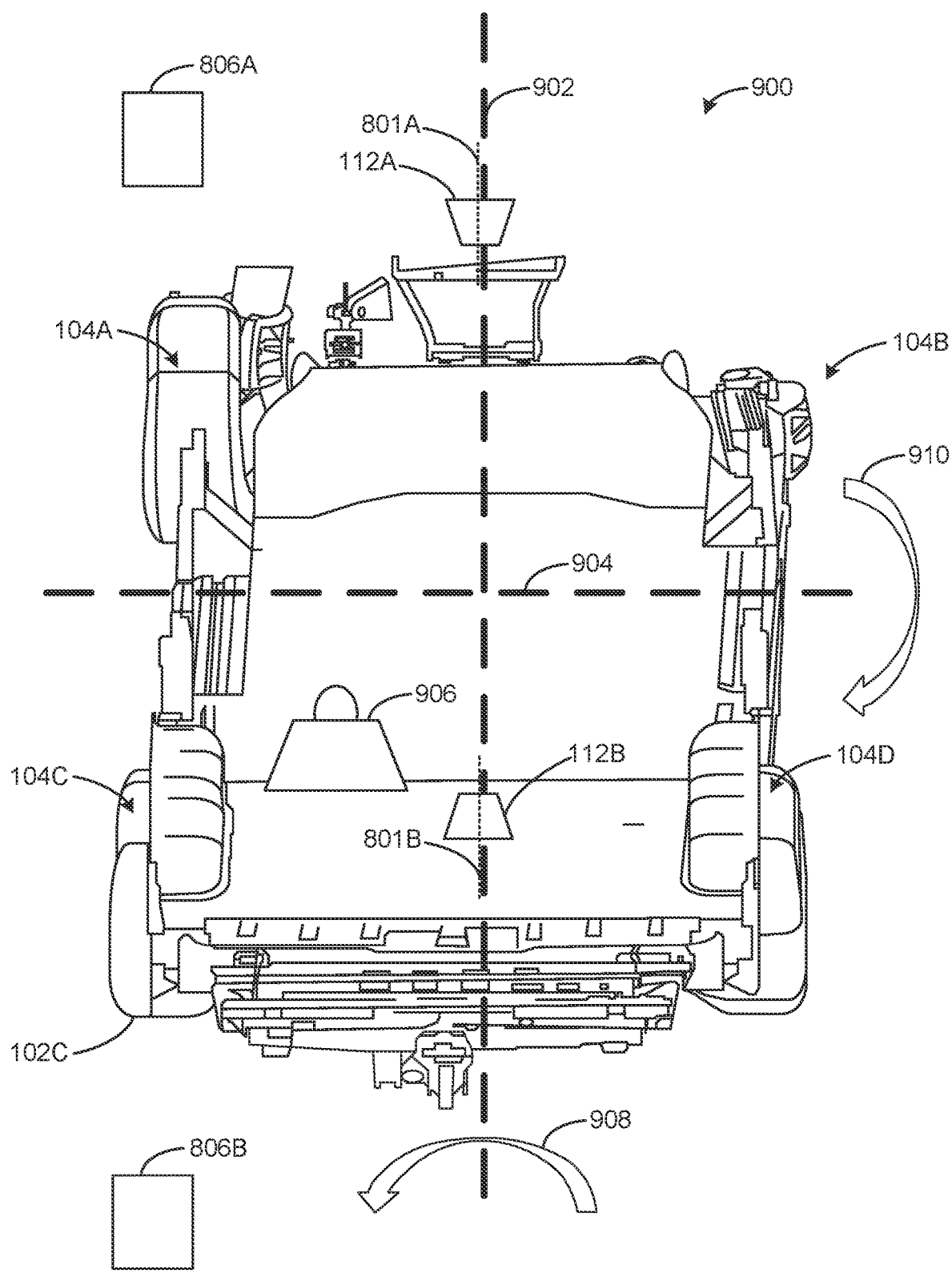
FIG. 9 is a perspective view of a vehicle showing the vehicle of FIG. 1 undergoing the example load of FIG. 8 and the corresponding orientation of the vehicle cameras.

FIG. 9 is a perspective view of the vehicle 100 of FIG. 1 in an example second load condition 900. In the illustrated example of FIG. 9, the vehicle 100 includes the front-facing camera 112A and the rear-facing camera 112B. In the illustrated example of FIG. 9, the vehicle 100 defines an example longitudinal axis 902 and an example horizontal axis 904 and is loaded with an example load 906 over the third wheel 102C. In the illustrated example of FIG. 9, the vehicle 100 has an example roll rotation 908 and an example pitch rotation 910 about the longitudinal axis 902 and the horizontal axis 904, respectively.

In the illustrated example of FIG. 9, the load 906 is placed over the third wheel 102C, which causes the third suspension component 104C to deflect with a greater magnitude than the other suspension components of the vehicle 100. The comparatively large deflection of the suspension component 104C causes the sprung mass of the vehicle 100 to undergo the roll rotation 908 and the pitch rotation 910. In some examples, by measuring the angular position and vertical displacement of the features 806A, 806B relative to the optical centerlines 801A, 801B, the load manager 108 can determine the relative deflection of each of the suspension components 104A, 104B, 104C, 104D. After determining the relative deflection of each of the suspension components 104A, 104B, 104C, 104D, the roll rotation 908 and the pitch rotation 910 of the sprung mass of the vehicle 100 can be determined. For example, a difference between the average deflection of the driver-side suspension components (e.g., the suspension components 104A, 104C, etc.) and the passenger-side suspension components (e.g., the suspension components 104B, 104B, etc.) can cause a rotation about the longitudinal axis 902 and a difference between the average deflection of the front suspension components (e.g., the suspension components 104A, 104B, etc.) and the rear suspension components (e.g., the suspension components 104C, 104D, etc.) cause a rotation about the horizontal axis 904.

Figure 10:
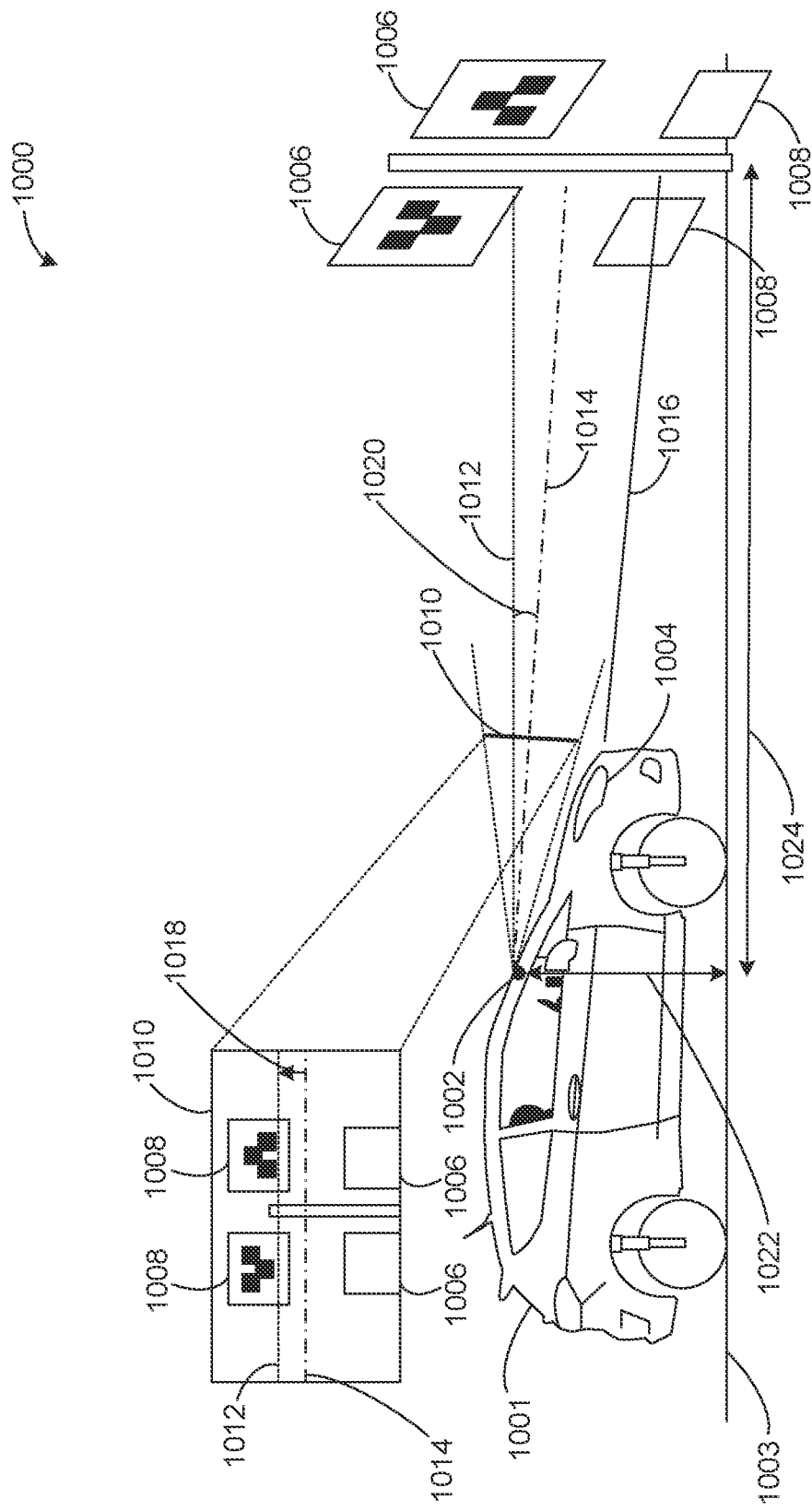
FIG. 10 is an example illustration showing an example process for calibrating a front-facing camera of a vehicle.

FIG. 10 is an example illustration showing an example calibration process 1000 for an example vehicle 1001 and an example front-facing camera 1002. In the illustrated example of FIG. 10, the vehicle 1001 is disposed on an example driving surface 1003 and includes example headlamps 1004. In the illustrated example of FIG. 10, the calibration process 1000 utilizes example targets 1006 and example calibration sensors 1008. During the calibration process 1000, the camera 1002 has an example view 1010 of the targets 1006 and the sensors 1008. The camera 1002 defines an example horizon line 1012, an example optical center line 1014, and an example reference line 1016 relative to the driving surface 1003. In the illustrated example of FIG. 10, the horizon line 1012 and the optical centerline 1014 have an example vertical displacement 1018 and define an example angle 1020. In the illustrated example of FIG. 10, the example camera 1002 has an example known height 1022 and an example known distance 1024 from the targets 1006.

In the illustrated example of FIG. 10, the targets 1006 are target auto calibration (TAC) targets (e.g., TAC patterns, etc.). In other examples, the targets 1006 can have any other recognizable indicium that facilitates visual detection by the camera 1002. In the illustrated example of FIG. 10, the targets 1006, the known height 1022, and the known distance 1024 enable the vehicle 1001 to calculate/determine the vertical displacement 1018 and the angle 1020. In some examples, the angle 1020 and the vertical displacement can vary between different instances of the vehicle 1001 because of mounting variations, differences in curb weights of the vehicle 1001, part variations within a manufacturing tolerance, etc. In some examples, if the horizon line 1012 appears at an angle relative to the optical centerline 1014 different than the angle 1020, the vehicle 1001 (e.g., the alert generator circuitry 212, etc.) can issue an alert to a user of the vehicle 1001 that the camera 1002 needs to be recalibrated and/or physically reoriented. The calibration process 1000 enables the orientation of the headlamps 1004 to be defined with the reference line 1016 and the sensors 1008.

In some examples, the calibration of the camera 1002 enables the horizon and/or the horizon line 1012 to be used as a visual identifiable feature with a known spatial relationship relative to the camera 1002. That is, the difference between the optical centerline of the vehicle 1001 in a loaded condition (e.g., the optical centerlines 801A, 801B of FIG. 8, etc.) and the optical centerline 1014 of the vehicle 1001 in the unloaded condition can be determined based on the location of the horizon. In some examples, because the angle 1020 between the optical centerline 1014 and the horizon line 1012 when the vehicle 1001 is unloaded was determined via calibration, changes in the angle 1020 due to suspension travel from vehicle loading, can be correlated to changes in vehicle loading. In some such examples, a look-up table correlating differences in measured angle and the calibrated angle 1020 can be related to a difference vehicle loads.

The illustrated example of FIG. 10 illustrates one technique (e.g., the calibration process 1000, etc.) to calibrate the camera 1002. However, it should be appreciated that other calibration processes/techniques are available to calibration of the camera 1002. Some and/or all of these processes can use the targets 1006 and/or other targets. In some such examples, the process 1000 and other processes enable the camera 1002 to self-calibrate during operation of the vehicle 1001.

FIG. 11 is a flowchart representative of example machine readable instructions and/or example operations 1100 that may be executed and/or instantiated by processor circuitry to determine a vehicle load using the underbody camera 110. The machine readable instructions and/or the operations 1100 of FIG. 11 begin at block 1102, at which the sensor interface circuitry receives sensor and camera data. For example, the sensor interface circuitry 202 can receive data from the sensors of the vehicle 100, including the cameras 110, 112A, 112B. In some examples, the sensor interface circuitry 202 can convert the data received from the components into a numerical form (e.g., human readable, etc.).

At block 1104, the grade determiner circuitry 204 can determine the surface grade and the condition of the vehicle 100. For example, the grade determiner circuitry 204 can determine the condition of the vehicle 100 based on the speed of the vehicle 100, a position of the steering system of the vehicle 100, etc. In some examples, the grade determiner circuitry 204 can compare the angle of the driving surface as viewed by the front-facing camera 112A and/or the rear-facing camera 112B. In some examples, the grade determiner circuitry 204 can determine the pitch of the vehicle 100 via a similar technique. In other examples, the grade determiner circuitry 204 can determine the grade of the driving surface of the vehicle and/or the pitch of the vehicle 100 by any other suitable means.

At block 1106, the grade determiner circuitry 204 determines if the surface grade and/or the vehicle condition permit weight estimation using photogrammetry. For example, the grade determiner circuitry 204 can compare the determined grade and vehicle condition to one or more thresholds to determine if photogrammetry can be used to determine the weight of the vehicle 100. In some examples, the grade determiner circuitry 204 can compare the speed of vehicle 100 to a first threshold (e.g., zero, etc.) and/or the position of the steering system of the vehicle 100 to a second threshold (e.g., oriented such that the wheels are straight-forward, etc.). In some examples, the grade determiner circuitry 204 can compare the detected grade to a third threshold (e.g., a threshold grade, etc.). In some examples, the thresholds can be empirically determined. In other examples, the grade determiner circuitry 204 can use thresholds determined by any other suitable metric (e.g., determined based on environmental factors, user input, etc.). If the grade determiner circuitry 204 determines the surface grade and/or the vehicle condition permits weight estimation using photogrammetry, the operations 1100 advance to block 1108. If the grade determiner circuitry 204 determines the surface grade and/or the vehicle condition do not permit weight estimation using photogrammetry, the operations 1100 end.

At block 1108, the sensor interface circuitry 202 captures first images using the front-facing camera 112A and the rear-facing camera 112B prior to vehicle loading. For example, the sensor interface circuitry 202 captures first images using the front-facing camera 112A and the rear-facing camera 112B after vehicle loading. For example, the sensor interface circuitry 202 can capture first images via the front-facing camera 112A and the rear-facing camera 112B. In other examples, the sensor interface circuitry 202 can capture the first images by any other suitable means.

At block 1110, the image analyzer circuitry 208 identifies the first images to identify visually identifiable features. For example, the image analyzer circuitry 208 can identify distinctive components of the vehicle 100 (e.g., the visually identifiable features 806A, 806B, etc.) and/or indicium disposed on the vehicle 100. For example, the image analyzer circuitry 208 can identify visually identifiable features via machine vision techniques. In other examples, the image analyzer circuitry 208 can identify visually identifiable features by any suitable means.

At block 1112, the image analyzer circuitry 208 identifies the first vertical position and/or first angular position relative to the features 806A, 806B. For example, the image analyzer circuitry 208 can identify a vertical position (e.g., a ride height, etc.) of the vehicle 100 and/or individual ones of the suspension components 104A, 104B, 104C, 104D relative to the features 806A, 806B. In some examples, the vertical position can determine the vertical position and/or angular position via pixel counting and/or pixel scaling. In other examples, the image analyzer circuitry 208 can determine the relative vertical position and/or the angular position by any other suitable means.

At block 1114, load change detector circuitry 206 determines if a load change has been detected. For example, the load change detector circuitry 206 can, via the cameras 110, 112A, 112B, detect significant changes in the load on the vehicle 100. Additionally or alternatively, the load change detector circuitry 206 can detect a load change via a user input via the user interface 106 and/or a mobile device associated with a user. In other examples, the load change detector circuitry 206 can detect load changes by any other suitable means (e.g., other optical sensors, etc.). If the load change detector circuitry 206 detects a load change, the operations 1100 advance to block 1116. If the load change detector circuitry 206 does not detect a load change, the operations 1100 end.

At block 1116, the sensor interface circuitry 202 captures second images using the front-facing camera 112A and the rear-facing camera 112B after vehicle loading. For example, captures second images prior to loading the vehicle 100. For example, the sensor interface circuitry 202 can capture second images via the front-facing camera 112A and the rear-facing camera 112B. In other examples, the sensor interface circuitry 202 can capture the first images by any other suitable means.

At block 1118, the image analyzer circuitry 208 identifies the first vehicle vertical position and/or first angular position relative to the reference points. For example, the image analyzer circuitry 208 can identify a vertical position (e.g., a ride height, etc.) of the vehicle 100 and/or individual ones of the suspension components 104A, 104B, 104C, 104D relative to the features 806A, 806B. In some examples, the vertical position can determine the vertical position and/or angular position via pixel counting and/or pixel scaling. In other examples, the image analyzer circuitry 208 can determine the relative vertical position and/or the angular position by any other suitable means.

At block 1120, the load determiner circuitry 210 determines the load condition based on the difference between first vertical position and the second vertical position and/or the first angular position and the second angular position. For example, the load determiner circuitry 210 determines the vehicle load based on the change in the vertical position of the vehicle 100 (e.g., the difference in the vertical position determined during the execution of block 1112 and block 1118, etc.) and the change in roll rotation 908 and/or pitch rotation 910 (e.g., the difference in the angular position determined during the execution of block 1112 and block 1118, etc.). For example, the load determiner circuitry 210 can determine a load carried by each of the suspension components 104A, 104B, 104C, 104D via the determined deflections and a look-up table correlating the deflection, the angular positions of the vehicle 100, and the weight. In some such examples, the look-up table can be empirically generated during the manufacturing and calibration (e.g., the calibration process 1000 of FIG. 10, etc.) of the vehicle 100. In other examples, the look-up table can be received from the central server 116. In some such examples, the look-up table can be generated based on load data received from vehicles similar to the vehicle 100. Additionally or alternatively, a transfer function/characteristic curve can be used to determine the vehicle load based on the deflections. In some such examples, the coefficients can be determined based on a physical characteristic of the suspension components 104A, 104B, 104C, 104D and/or during the calibration of the vehicle 100.

At block 1122, the alert generator circuitry 212 determines if an alert is to be generated based on the load condition. For example, the alert generator circuitry 212 can generate an alert in response to determining the load condition of the vehicle 100 does not satisfy a threshold. In some examples, the threshold can correspond to the GAWR of the vehicle 100 and/or any other suitable weight capability of the vehicle 100. In some examples, the threshold can correspond to the weight distribution of the vehicle 100 (e.g., a percentage of the vehicle load carried by a specific one of the axles of the vehicle 100, a perchance of the vehicle load carried by a specific one of the wheels 102A, 102B, 102C, 102D, etc.). In some examples, the threshold can correspond to a roll threshold and/or a pitch threshold. If the alert generator circuitry 212 determines an alert should be generated, the operations 1100 advance to block 1124. If the alert generator circuitry 212 determines an alert should not be generated, the operations 1100 advance to block 1126.

At block 1124, the alert generator circuitry 212 generates an alert. For example, the alert generator circuitry 212 can generate an alert to be presented via the user interface 106. In some examples, the alert generator circuitry 212 can generate a visual alert, an audio alert, and/or a tactile alert. Additionally or alternatively, the alert generator circuitry 212 can generate by any other suitable means.

At block 1126, the network interface circuitry 214 uploads information related to the load change to the central server 116. For example, the network interface circuitry 214 can send information (e.g., the recorded ride height change, the determined load, the environmental conditions, etc.) to the central server 116 via the network 114. In other examples, the network interface circuitry 214 can send the information to the database by any other suitable means. In some examples, the data in the central server 116 can be used (e.g., by a manufacturer of the vehicle 100, etc.) to generate updated look-up tables. In some examples, the execution of block 1126 can be omitted. In such examples, the network interface circuitry 214 can store the information in a local memory of the vehicle 100 (e.g., the memory 1214, 1216, 1228 of FIG. 12, etc.) and/or discard the information.

At block 1128, the vehicle interface circuitry 216 adjusts the driving characteristics of the vehicle 100 based on the vehicle load change. For example, the vehicle interface circuitry 216 can change a stiffness and/or displacement of the suspension system of the vehicle 100. In other examples, the vehicle interface circuitry 216 can change any other suitable characteristic of the vehicle 100 (e.g., a braking torque gain, a power steering assistance, etc.). The operations 1100 end.

Figure 12:
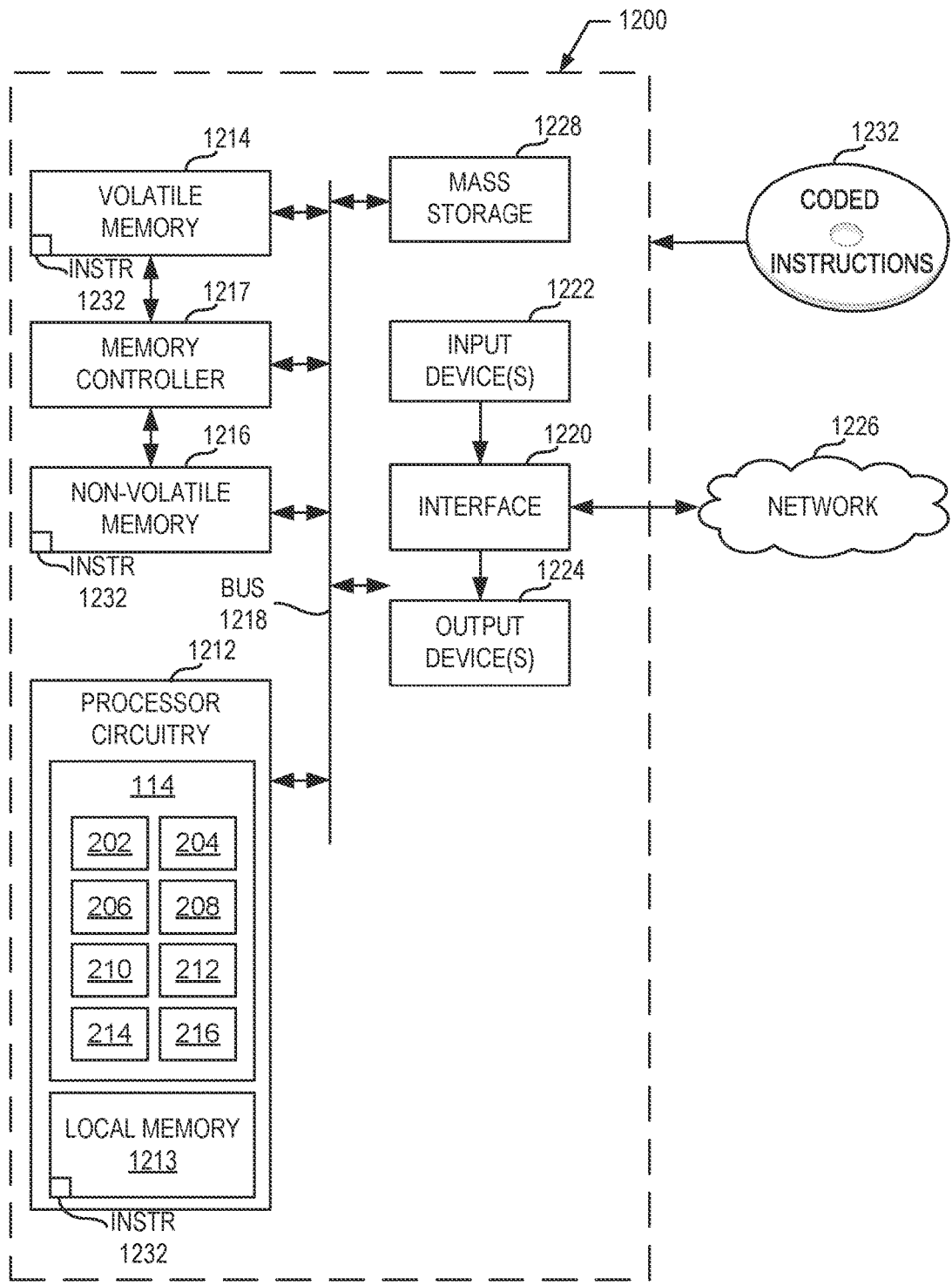
FIG. 12 is a block diagram of an example processing platform including processor circuitry structured to execute the example machine readable instructions and/or the example operations of FIGS. 4, 7, and 11 to implement the load manager of FIG. 2.

FIG. 12 is a block diagram of an example processor platform 1200 structured to execute and/or instantiate the machine readable instructions and/or the operations of FIGS. 4, 7, and 11 to implement the load manager 108 of FIGS. 1 and 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example sensor interface circuitry 202, the example grade determiner circuitry 204, the example load change detector circuitry 206, the example image analyzer circuitry 208, the example load determiner circuitry 210, the example alert generator circuitry 212, the example network interface circuitry 214, and the example vehicle interface circuitry 216.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1232, which may be implemented by the machine readable instructions of FIGS. 5 and 8, may be stored in the mass storage device 1228, in the volatile memory 1214, in the non-volatile memory 1216, and/or on a removable non-transitory computer readable storage medium such as a CD or DVD.

Figure 13:
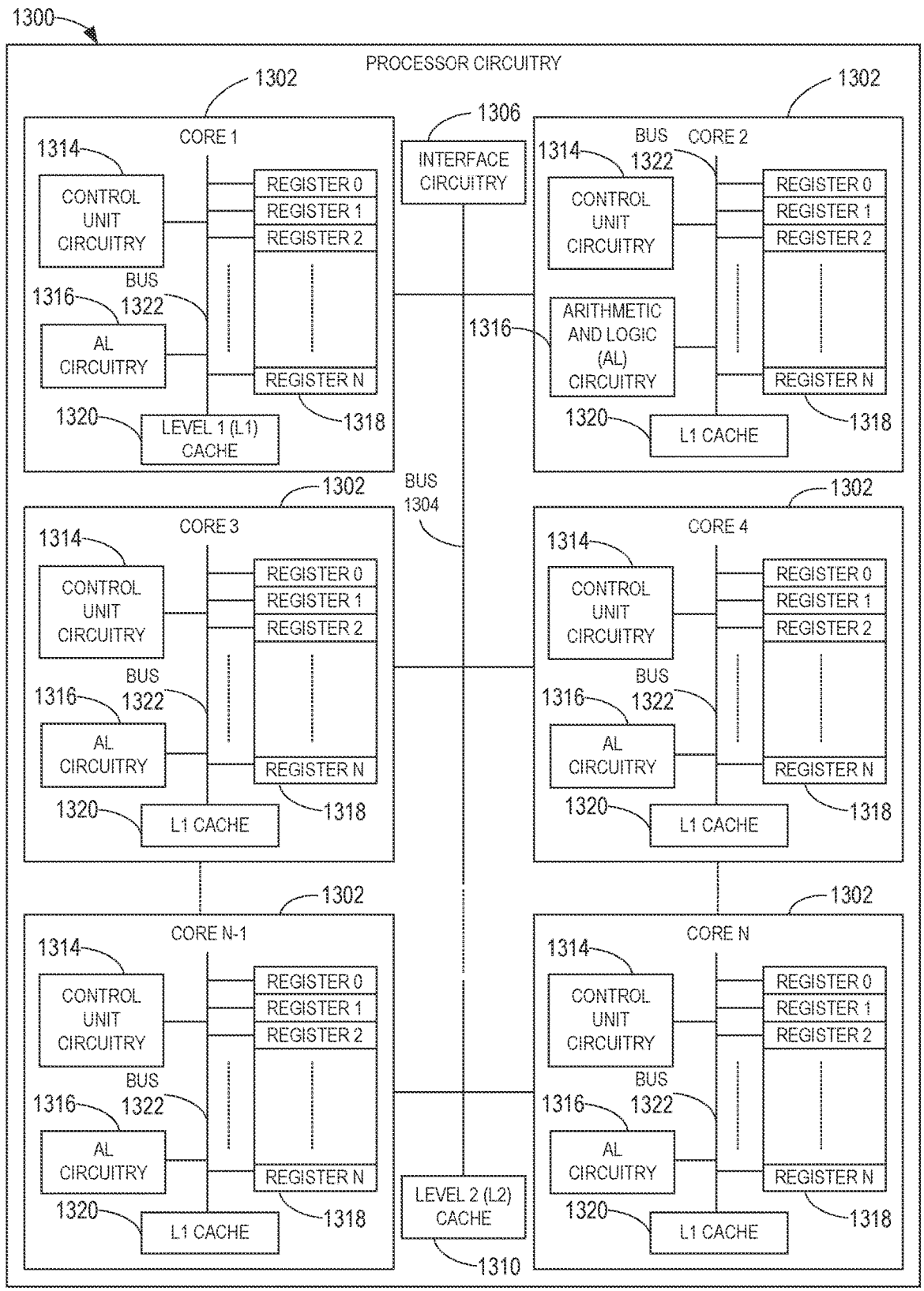
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 4, 7, and 11 to effectively instantiate the circuitry of FIG. 2 as logic circuits to perform the operations corresponding to those machine readable instructions. In some such pies, the circuitry of FIG. 2 is instantiated by the hardware circuits of the microprocessor 1400 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 4, 7, and 11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register (s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
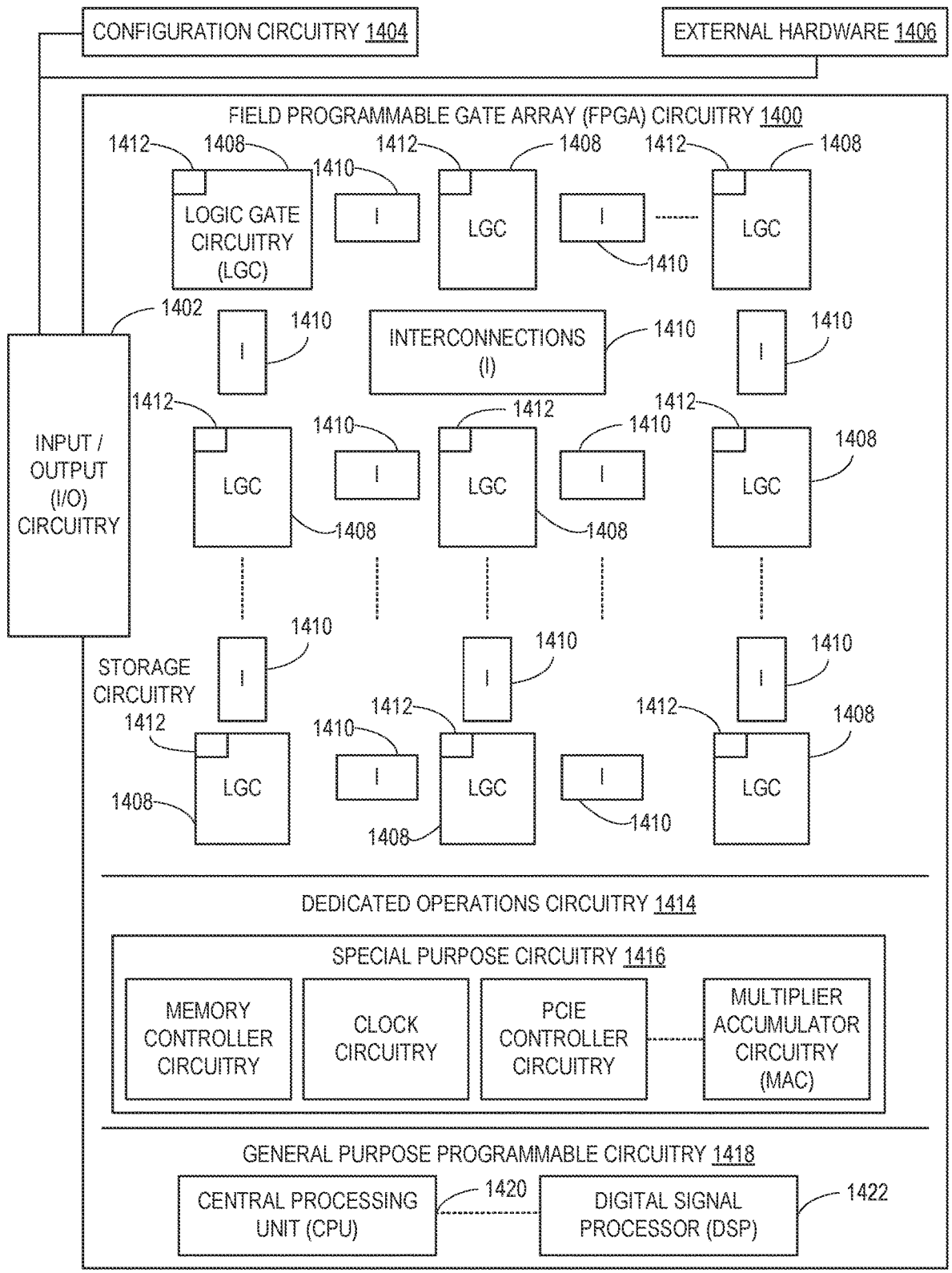
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 4, 7, and 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 4, 7, and 11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 4, 7, and 11. As such, the FPGA circuitry 1400 may be structured to effectively instantiate some or all of the machine readable instructions of the flowcharts of FIGS. 4, 7, and 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 4, 7, and 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 6, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 5 and 8 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 4, 7, and 11 may be executed by one or more of the cores 1302 of FIG. 13, a second portion of the machine readable instructions represented by the flowcharts of FIGS. 4, 7, and 11 may be executed by the FPGA circuitry 1400 of FIG. 14, and/or a third portion of the machine readable instructions represented by the flowcharts of FIGS. 4, 7, and 11 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Example methods, apparatus, systems, and articles of manufacture to determine the load of a vehicle via camera-based height measurement are disclosed herein. Further examples and combinations thereof include the following:

Example 1 includes a vehicle comprising a suspension assembly associated with a wheel, a first feature, a first camera, and a processor to execute instructions to capture, via the first camera, a first image including the first feature and a second feature, the first feature and a second feature having a first spatial relationship in the first image, capture, via the first camera, a second image including the first feature and the second feature, the first feature and the second feature having a second spatial relationship in the second image, and determine, based on a difference between the first spatial relationship and the second spatial relationship, a deflection of the suspension assembly.

Example 2 includes the vehicle of example 1, wherein the processor executers instructions to determine a load on the vehicle based on the deflection, and modify a performance characteristic of the vehicle based on the load.

Example 3 includes the vehicle of example 1, wherein the first feature is rigidly coupled to the sprung mass of the vehicle.

Example 4 includes the vehicle of example 1, wherein the first camera is a back-up camera and the first feature is a hitch-ball.

Example 5 includes the vehicle of example 4, further including a second camera disposed on a front of the vehicle and wherein the processor executers instructions to capture, via the second camera, a third image, determine, based on the first image and the third image, a pitch of the vehicle, and determine, based on the first image and the third image, a grade of a driving surface of the vehicle, the deflection of the suspension assembly further determined based on at least one of the grade or the pitch.

Example 6 includes the vehicle of example 1, wherein the second feature is an external feature adjacent to the vehicle.

Example 7 includes the vehicle of example 1, wherein the processor executers instructions to prompt a user of the vehicle to input a dimension of the first feature, the deflection of the suspension assembly further determined based on the dimension of the first feature.

Example 8 includes a method comprising capturing, via a first camera associated with a vehicle, a first image including a first feature of the vehicle and a second feature adjacent to the vehicle, the first feature and the second feature having a first spatial relationship in the first image, capturing, via the first camera, a second image including the first feature and the second feature, the first feature and the second feature having a second spatial relationship in the second image, and determining, based on a difference between the first spatial relationship and the second spatial relationship, a deflection of a suspension assembly of the vehicle.

Example 9 includes the method of example 8, further including determining a load on the vehicle based on the deflection, and modifying a performance characteristic of the vehicle based on the load.

Example 10 includes the method of example 8, wherein the first feature is rigidly coupled to a sprung mass of the vehicle.

Example 11 includes the method of example 8, wherein the first camera is a back-up camera and the first feature is a hitch-ball.

Example 12 includes the method of example 11, further including capture, via a second camera associated with the vehicle, a third image, determine, based on the first image and the third image, a pitch of the vehicle, and determine, based on the first image and the third image, a grade of a driving surface of the vehicle, the deflection of the suspension assembly further determined based on at least one of the grade or the pitch.

Example 13 includes the method of example 8, wherein the second feature is an external feature adjacent to the vehicle.

Example 14 includes the method of example 8, further including prompting a user of the vehicle to input a dimension of the first feature, the deflection of the suspension assembly further determined based on the dimension of the first feature.

Example 15 includes a non-transitory computer readable medium comprising instructions, which when executed cause a processor to at least capture, via a first camera associated with a vehicle, a first image including a first feature of the vehicle and a second feature, the first feature and the second feature having a first spatial relationship in the first image, capture, via the first camera, a second image including the first feature and the second feature, the first feature and the second feature having a second spatial relationship in the second image, and determine, based on a difference between the first spatial relationship and the second spatial relationship, a deflection of a suspension assembly of the vehicle.

Example 16 includes the non-transitory computer readable medium of example 15, wherein the instructions when executed cause a processor to determine a load on the vehicle based on the deflection, and modify a performance characteristic of the vehicle based on the load.

Example 17 includes the non-transitory computer readable medium of example 15, wherein the first feature is rigidly coupled to a sprung mass of the vehicle.

Example 18 includes the non-transitory computer readable medium of example 15, wherein the first camera is a back-up camera and the first feature is a hitch-ball.

Example 19 includes the non-transitory computer readable medium of example 18, wherein the instructions when executed cause a processor to capture, via a second camera associated with the vehicle, a third image, determine, based on the first image and the third image, a pitch of the vehicle, and determine, based on the first image and the third image, a grade of a driving surface of the vehicle, the deflection of the suspension assembly further determined based on at least one of the grade or the pitch.

Example 20 includes the non-transitory computer readable medium of example 15, wherein the second feature is an external feature adjacent to the vehicle.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A vehicle comprising:
a suspension assembly associated with a wheel;
a first feature;
a first camera; and
a processor to execute instructions to:
capture, via the first camera, a first image including the first feature and a second feature, the first feature and the second feature having a first spatial relationship in the first image;
capture, via the first camera, a second image including the first feature and the second feature, the first feature and the second feature having a second spatial relationship in the second image; and
determine, based on a difference between the first spatial relationship and the second spatial relationship, a deflection of the suspension assembly; and
modify a performance characteristic of the vehicle based on the deflection.

2. The vehicle of claim 1, wherein the processor executes instructions to:
determine a load on the vehicle based on the deflection.

3. The vehicle of claim 1, wherein the first feature is rigidly coupled to a sprung mass of the vehicle.

4. The vehicle of claim 1, wherein the first camera is a back-up camera and the first feature is a hitch-ball.

5. The vehicle of claim 4, further including a second camera disposed on a front of the vehicle and wherein the processor executers instructions to:
capture, via the second camera, a third image;
determine, based on the first image and the third image, a pitch of the vehicle; and determine, based on the first image and the third image, a grade of a driving surface of the vehicle, the deflection of the suspension assembly further determined based on at least one of the grade or the pitch.

6. The vehicle of claim 1, wherein the second feature is an external feature adjacent to the vehicle.

7. The vehicle of claim 1, wherein the processor executes instructions to prompt a user of the vehicle to input a dimension of the first feature, the deflection of the suspension assembly further determined based on the dimension of the first feature.

8. A method comprising:
capturing, via a first camera associated with a vehicle, a first image including a first feature of the vehicle and a second feature adjacent to the vehicle, the first feature and the second feature having a first spatial relationship in the first image;
capturing, via the first camera, a second image including the first feature and the second feature, the first feature and the second feature having a second spatial relationship in the second image;
determining, based on a difference between the first spatial relationship and the second spatial relationship, a deflection of a suspension assembly of the vehicle; and
modifying a performance characteristic of the vehicle based on the deflection.

9. The method of claim 8, further including
determining a load on the vehicle based on the deflection.

10. The method of claim 8, wherein the first feature is rigidly coupled to a sprung mass of the vehicle.

11. The method of claim 8, wherein the first camera is a back-up camera and the first feature is a hitch-ball.

12. The method of claim 11, further including:
capturing, via a second camera associated with the vehicle, a third image;
determining, based on the first image and the third image, a pitch of the vehicle; and
determining, based on the first image and the third image, a grade of a driving surface of the vehicle, the deflection of the suspension assembly further determined based on at least one of the grade or the pitch.

13. The method of claim 8, wherein the second feature is an external feature adjacent to the vehicle.

14. The method of claim 8, further including prompting a user of the vehicle to input a dimension of the first feature, the deflection of the suspension assembly further determined based on the dimension of the first feature.

15. A non-transitory computer readable medium comprising instructions, which when executed cause a processor to at least:
capture, via a first camera associated with a vehicle, a first image including a first feature of the vehicle and a second feature, the first feature and the second feature having a first spatial relationship in the first image;
capture, via the first camera, a second image including the first feature and the second feature, the first feature and the second feature having a second spatial relationship in the second image;
determine, based on a difference between the first spatial relationship and the second spatial relationship, a deflection of a suspension assembly of the vehicle; and
modify a performance characteristic of the vehicle based on the deflection.

16. The non-transitory computer readable medium of claim 15, wherein the instructions when executed cause a processor to
determine a load on the vehicle based on the deflection.

17. The non-transitory computer readable medium of claim 15, wherein the first feature is rigidly coupled to a sprung mass of the vehicle.

18. The non-transitory computer readable medium of claim 15, wherein the first camera is a back-up camera and the first feature is a hitch-ball.

19. The non-transitory computer readable medium of claim 18, wherein the instructions when executed cause a processor to:
capture, via a second camera associated with the vehicle, a third image;
determine, based on the first image and the third image, a pitch of the vehicle; and determine, based on the first image and the third image, a grade of a driving surface of the vehicle, the deflection of the suspension assembly further determined based on at least one of the grade or the pitch.

20. The non-transitory computer readable medium of claim 15, wherein the second feature is an external feature adjacent to the vehicle.

\* \* \* \* \*

UNITED STATES PATENT AND TRADEMARK OFFICE
CERTIFICATE OF CORRECTION

| | | |
|---|---|---|
| PATENT NO. | : 12,456,304 B2 | Page 1 of 1 |
| APPLICATION NO. | : 17/845557 | |
| DATED | : October 28, 2025 | |
| INVENTOR(S) | : Weston et al. | |

It is certified that error appears in the above-identified patent and that said Letters Patent is hereby corrected as shown below:

In the Drawings

Sheet 4, Fig. 4, and on the title page, the illustrative print figure, reference numeral 406, Delete: "PHOTOGRAMETRY?" and Insert: --PHOTOGRAMMETRY?--

Sheet 7, Fig. 7, reference numeral 706, Delete: "PHOTOGRAMETRY?" and Insert: --PHOTOGRAMMETRY?--

Sheet 11, Fig. 11, reference numeral 1106, Delete: "PHOTOGRAMETRY?" and Insert: --PHOTOGRAMMETRY?--

Sheet 11, Fig. 11, reference numeral 1110, Delete: "DISTINTIVE" and Insert: --DISTINCTIVE--

In the Claims

Column 34, Claim 2, Line 45, Delete: ":"

Signed and Sealed this
Sixth Day of January, 2026

John A. Squires
*Director of the United States Patent and Trademark Office*